US012552100B2

(12) United States Patent
Fulton et al.

(10) Patent No.: US 12,552,100 B2
(45) Date of Patent: Feb. 17, 2026

(54) ADDITIVE MANUFACTURING APPARATUSES AND METHODS FOR USING THE SAME

(71) Applicant: GENERAL ELECTRIC COMPANY, Schenectady, NY (US)

(72) Inventors: Victor Fulton, Amelia, OH (US); Carlos H. Bonilla, Lebanon, OH (US); Jacob Mayer, Cincinnati, OH (US); Timothy Francis Andrews, Sharonville, OH (US); Joshua Tyler Mook, Cincinnati, OH (US); Peter Douglas Lueschen, Covington, KY (US); John Sterle, Clifton Park, NY (US); Vadim Bromberg, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 306 days.

(21) Appl. No.: 18/250,859

(22) PCT Filed: Oct. 27, 2021

(86) PCT No.: PCT/US2021/056787
§ 371 (c)(1),
(2) Date: Apr. 27, 2023

(87) PCT Pub. No.: WO2022/093914
PCT Pub. Date: May 5, 2022

(65) Prior Publication Data
US 2023/0398736 A1     Dec. 14, 2023

Related U.S. Application Data

(60) Provisional application No. 63/107,159, filed on Oct. 29, 2020.

(51) Int. Cl.
*B29C 67/00* (2017.01)
*B29C 64/236* (2017.01)
(Continued)

(52) U.S. Cl.
CPC ............ *B29C 64/25* (2017.08); *B29C 64/236* (2017.08); *B29C 64/35* (2017.08); *B33Y 30/00* (2014.12)

(58) Field of Classification Search
CPC ......... B29C 64/10; B29C 64/20; B29C 64/25; B29C 64/30; B29C 64/364; B33Y 10/00; B33Y 30/00; B33Y 40/00
See application file for complete search history.

(56) References Cited

U.S. PATENT DOCUMENTS

| 4,034,219 A | 7/1977 | Louden et al. |
| 4,404,566 A | 9/1983 | Clark et al. |

(Continued)

FOREIGN PATENT DOCUMENTS

| CN | 201815393 U | 5/2011 |
| CN | 103949636 A | 7/2014 |

(Continued)

OTHER PUBLICATIONS

US 9,744,592 B1, 08/2017, Schmitt et al. (withdrawn)
(Continued)

*Primary Examiner* — Thu Khanh T. Nguyen
(74) *Attorney, Agent, or Firm* — Dinsmore & Shohl LLP

(57) ABSTRACT

In embodiments, an additive manufacturing apparatus comprises a chassis assembly and a skin at least partially covering the chassis assembly. The chassis assembly comprises a lower chassis section secured to a low voltage chassis section; an upper environmental chassis section secured to and extending over the low voltage chassis section and the lower chassis section; a high voltage chassis
(Continued)

section secured to the upper environmental chassis section and the lower chassis section; and a build receptacle carriage adjustably coupled to the lower chassis section. The skin comprises first and second doors providing access to the low voltage chassis section and the high voltage chassis section; a rear panel providing access to the upper environmental chassis section; a top panel covering a top of the upper environmental chassis section; and at least one hinged door providing access to the lower chassis section.

20 Claims, 17 Drawing Sheets

(51) Int. Cl.
  *B29C 64/25* (2017.01)
  *B29C 64/35* (2017.01)
  *B33Y 30/00* (2015.01)

(56) References Cited

U.S. PATENT DOCUMENTS

| | | |
|---|---|---|
| 4,680,895 A | 7/1987 | Roestenberg |
| 4,722,824 A | 2/1988 | Wiech, Jr. |
| 5,012,260 A | 4/1991 | Yoshimura et al. |
| 5,204,055 A | 4/1993 | Sachs et al. |
| 5,387,380 A | 2/1995 | Cima et al. |
| 6,007,318 A | 12/1999 | Russell et al. |
| 6,092,887 A | 7/2000 | Tanino et al. |
| 6,159,085 A | 12/2000 | Hara |
| 6,375,874 B1 | 4/2002 | Russell et al. |
| 6,454,811 B1 | 9/2002 | Sherwood et al. |
| 6,607,572 B2 | 8/2003 | Gammack et al. |
| 6,657,155 B2 | 12/2003 | Abe et al. |
| 6,764,636 B1 | 7/2004 | Allanic et al. |
| 6,824,714 B1 | 11/2004 | Turck et al. |
| 6,835,222 B2 | 12/2004 | Gammack |
| 6,945,638 B2 | 9/2005 | Teung et al. |
| 6,989,115 B2 | 1/2006 | Russell et al. |
| 7,034,246 B2 | 4/2006 | Muylaert et al. |
| 7,037,382 B2 | 5/2006 | Davidson et al. |
| 7,204,684 B2 | 4/2007 | Ederer et al. |
| 7,225,803 B2 | 6/2007 | Boyadjieff |
| 7,281,785 B2 | 10/2007 | Palifka et al. |
| 7,291,002 B2 | 11/2007 | Russell et al. |
| 7,296,990 B2 | 11/2007 | Devos et al. |
| 7,357,629 B2 | 4/2008 | Weiskopf et al. |
| 7,387,359 B2 | 6/2008 | Hernandez et al. |
| 7,389,154 B2 | 6/2008 | Hunter et al. |
| 7,435,368 B2 | 10/2008 | Davidson et al. |
| 7,585,450 B2 | 9/2009 | Wahlstrom et al. |
| 7,686,995 B2 | 3/2010 | Davidson et al. |
| 7,690,909 B2 | 4/2010 | Wahlstrom |
| 7,820,241 B2 | 10/2010 | Perret et al. |
| 7,824,001 B2 | 11/2010 | Fienup et al. |
| 7,850,271 B2 | 12/2010 | Gothait et al. |
| 7,879,123 B2 | 2/2011 | Lundquist et al. |
| 7,971,991 B2 | 7/2011 | Davidson et al. |
| 7,979,152 B2 | 7/2011 | Davidson |
| 8,017,055 B2 | 9/2011 | Davidson et al. |
| 8,033,812 B2 | 10/2011 | Collins et al. |
| 8,105,527 B2 | 1/2012 | Wahlstrom |
| 8,167,395 B2 | 5/2012 | Fienup et al. |
| 8,185,229 B2 | 5/2012 | Davidson |
| 8,322,821 B2 | 12/2012 | Tsai et al. |
| 8,951,033 B2 | 2/2015 | Hchsmann et al. |
| 8,956,144 B2 | 2/2015 | Grasegger et al. |
| 8,997,799 B2 | 4/2015 | Hodson et al. |
| 9,027,378 B2 | 5/2015 | Crump et al. |
| 9,346,127 B2 | 5/2016 | Buller et al. |
| 9,403,235 B2 | 8/2016 | Buller et al. |
| 9,446,448 B2 | 9/2016 | Mccoy et al. |
| 9,586,290 B2 | 3/2017 | Buller et al. |
| 9,636,870 B2 | 5/2017 | Kuzusako et al. |
| 9,912,915 B2 | 3/2018 | Sinclair |
| 9,919,474 B2 | 3/2018 | Napadensky |
| 9,989,396 B2 | 6/2018 | Gold et al. |
| 10,022,794 B1 | 7/2018 | Redding et al. |
| 10,093,103 B2 | 10/2018 | Araki et al. |
| 10,166,603 B2 | 1/2019 | Kawada et al. |
| 10,183,330 B2 | 1/2019 | Buller et al. |
| 10,189,267 B2 | 1/2019 | Sakai et al. |
| 10,195,693 B2 | 2/2019 | Buller et al. |
| 10,232,443 B2 | 3/2019 | Myerberg et al. |
| 10,259,044 B2 | 4/2019 | Buller et al. |
| 10,272,492 B2 | 4/2019 | Gibson et al. |
| 10,272,525 B1 | 4/2019 | Buller et al. |
| 10,286,452 B2 | 5/2019 | Buller et al. |
| 10,286,571 B2 | 5/2019 | Hchsmann et al. |
| 10,336,053 B2 | 7/2019 | Sasaki |
| 10,343,725 B2 | 7/2019 | Martin et al. |
| 10,350,682 B2 | 7/2019 | Myerberg et al. |
| 10,406,262 B2 | 9/2019 | Bonassar et al. |
| 10,414,089 B2 | 9/2019 | Maier |
| 10,449,696 B2 | 10/2019 | Elgar et al. |
| 10,486,361 B2 | 11/2019 | Kawabata |
| 10,486,363 B2 | 11/2019 | Sachs et al. |
| 10,569,331 B2 | 2/2020 | Kawada et al. |
| 10,632,675 B2 | 4/2020 | Chanclon et al. |
| 10,695,981 B2 | 6/2020 | Hchsmann et al. |
| 11,167,454 B2 | 11/2021 | Rockstroh et al. |
| 2002/0043055 A1 | 4/2002 | Conrad |
| 2002/0079601 A1 | 6/2002 | Russell et al. |
| 2002/0116907 A1 | 8/2002 | Gammack et al. |
| 2004/0194250 A1 | 10/2004 | Conrad et al. |
| 2006/0219163 A1 | 10/2006 | Merot et al. |
| 2006/0221127 A1 | 10/2006 | Lee et al. |
| 2007/0077323 A1 | 4/2007 | Stonesmith et al. |
| 2008/0111271 A1 | 5/2008 | Khoshnevis |
| 2008/0117240 A1 | 5/2008 | Sheinman |
| 2008/0200104 A1 | 8/2008 | Chuang |
| 2008/0284819 A1 | 11/2008 | Owaki et al. |
| 2008/0303882 A1 | 12/2008 | Silverbrook et al. |
| 2008/0303883 A1 | 12/2008 | Miyazawa |
| 2010/0043698 A1 | 2/2010 | Bolt |
| 2012/0018032 A1 | 1/2012 | Von Essen |
| 2013/0004607 A1 | 1/2013 | Hoechsmann et al. |
| 2014/0240396 A1 | 8/2014 | Rosati et al. |
| 2015/0110911 A1 | 4/2015 | Snyder |
| 2015/0298394 A1 | 10/2015 | Sheinman |
| 2015/0343533 A1 | 12/2015 | Park et al. |
| 2016/0052054 A1 | 2/2016 | Orange et al. |
| 2016/0096360 A1 | 4/2016 | Zetzl et al. |
| 2016/0114533 A1 | 4/2016 | Grasegger et al. |
| 2016/0151973 A1 | 6/2016 | Juan Jover et al. |
| 2016/0339640 A1 | 11/2016 | Juan et al. |
| 2016/0361874 A1 | 12/2016 | Park et al. |
| 2016/0368054 A1 | 12/2016 | Ng et al. |
| 2017/0050378 A1 | 2/2017 | Ederer et al. |
| 2017/0106443 A1 | 4/2017 | Karlsson |
| 2017/0106595 A1 | 4/2017 | Gnther et al. |
| 2017/0120521 A1 | 5/2017 | Sakura et al. |
| 2017/0144374 A1 | 5/2017 | Ono |
| 2017/0182717 A1 | 6/2017 | Byun et al. |
| 2017/0203514 A1 | 7/2017 | McCoy et al. |
| 2017/0217104 A1 | 8/2017 | Cortes I Herms et al. |
| 2017/0239725 A1 | 8/2017 | Ufton |
| 2017/0246808 A1 | 8/2017 | Hchsmann et al. |
| 2017/0252975 A1 | 9/2017 | Park |
| 2017/0266880 A1 | 9/2017 | Matsubara |
| 2017/0334138 A1 | 11/2017 | Vilajosana et al. |
| 2017/0334144 A1 | 11/2017 | Fish et al. |
| 2018/0001567 A1 | 1/2018 | Juan et al. |
| 2018/0009110 A1 | 1/2018 | Langford et al. |
| 2018/0056582 A1 | 3/2018 | Matusik et al. |
| 2018/0111194 A1 | 4/2018 | Buller et al. |
| 2018/0111196 A1 | 4/2018 | Brezoczky et al. |
| 2018/0236504 A1 | 8/2018 | Pourcher et al. |
| 2018/0297283 A1 | 10/2018 | Hagedorn et al. |
| 2018/0304364 A1 | 10/2018 | Myerberg et al. |
| 2018/0339467 A1 | 11/2018 | Donovan et al. |
| 2018/0345541 A1 | 12/2018 | Cuyt et al. |
| 2019/0001413 A1 | 1/2019 | Golz et al. |

(56) References Cited

U.S. PATENT DOCUMENTS

| | | |
|---|---|---|
| 2019/0070779 A1 | 3/2019 | Chen et al. |
| 2019/0084231 A1 | 3/2019 | Chanclon Fernandez et al. |
| 2019/0134705 A1 | 5/2019 | Sheinman et al. |
| 2019/0152148 A1 | 5/2019 | Kremer |
| 2019/0160733 A1 | 5/2019 | Mirkin et al. |
| 2019/0201982 A1 | 7/2019 | Lombardo et al. |
| 2019/0210277 A1 | 7/2019 | Sachs et al. |
| 2019/0210282 A1 | 7/2019 | Sugiura et al. |
| 2019/0217385 A1 | 7/2019 | Bonilla Gonzalez et al. |
| 2019/0218501 A1 | 7/2019 | Kamen et al. |
| 2019/0240732 A1 | 8/2019 | Koch et al. |
| 2019/0358901 A1 | 11/2019 | Dugan |
| 2019/0366626 A1 | 12/2019 | Swartz et al. |
| 2020/0147885 A1 | 5/2020 | Gimenez Manent et al. |
| 2020/0282461 A1 | 9/2020 | Fang |
| 2020/0298474 A1 | 9/2020 | Gimenez et al. |
| 2020/0324467 A1 | 10/2020 | Tjellesen et al. |
| 2022/0314329 A1* | 10/2022 | Bromberg ............... B29C 64/25 |

FOREIGN PATENT DOCUMENTS

| | | |
|---|---|---|
| CN | 103862045 B | 1/2017 |
| CN | 106738907 A | 5/2017 |
| CN | 206528076 U | 9/2017 |
| CN | 109366982 A | 2/2019 |
| CN | 208745355 U | 4/2019 |
| CN | 109732916 A | 5/2019 |
| CN | 110076991 A | 8/2019 |
| CN | 209851598 U | 12/2019 |
| CN | 210211384 U | 3/2020 |
| CN | 210880916 U | 6/2020 |
| DE | 19743804 A1 | 4/1999 |
| DE | 19846478 A1 | 4/2000 |
| DE | 102009036153 A1 | 2/2011 |
| DE | 202013009787 U1 | 12/2013 |
| EP | 1704989 A2 | 9/2006 |
| EP | 1847370 A2 | 10/2007 |
| EP | 1776910 B1 | 4/2013 |
| EP | 2782743 A1 | 10/2014 |
| EP | 2091718 B1 | 8/2016 |
| EP | 2986405 B1 | 2/2017 |
| EP | 3456518 A1 | 3/2019 |
| EP | 3461574 A1 | 4/2019 |
| EP | 3475057 A1 | 5/2019 |
| EP | 3492244 A1 | 6/2019 |
| EP | 3511094 A1 | 7/2019 |
| EP | 3560714 A1 | 10/2019 |
| EP | 3566869 A2 | 11/2019 |
| EP | 3463817 B1 | 4/2021 |
| EP | 3575064 B1 | 8/2021 |
| GB | 2550339 A | 11/2017 |
| JP | 2002292751 A | 10/2002 |
| JP | 2006511365 A | 4/2006 |
| JP | 2009136758 A | 6/2009 |
| JP | 2010149318 A | 7/2010 |
| JP | 2013193222 A | 9/2013 |
| JP | 2015522438 A | 8/2015 |
| JP | 2018001414 A | 1/2018 |
| JP | 2018047562 A | 3/2018 |
| JP | 2018144037 A | 9/2018 |
| JP | 2020093259 A | 6/2020 |
| WO | 2010055751 A1 | 5/2010 |
| WO | 2011005690 A1 | 1/2011 |
| WO | 2013182913 A2 | 12/2013 |
| WO | 2014006877 A1 | 1/2014 |
| WO | 2014044676 A1 | 3/2014 |
| WO | 2014096177 A1 | 6/2014 |
| WO | 2015112885 A1 | 7/2015 |
| WO | 2015141779 A1 | 9/2015 |
| WO | 2016040453 A1 | 3/2016 |
| WO | 2016055523 A1 | 4/2016 |
| WO | 2016083234 A1 | 6/2016 |
| WO | 2017017272 A1 | 2/2017 |
| WO | 2017088897 A1 | 6/2017 |
| WO | 2017152142 A1 | 9/2017 |
| WO | 2017180314 A1 | 10/2017 |
| WO | 2018017117 A1 | 1/2018 |
| WO | 2018149544 A1 | 8/2018 |
| WO | 2018181334 A1 | 10/2018 |
| WO | 2018183396 A1 | 10/2018 |
| WO | 2018191667 A1 | 10/2018 |
| WO | 2018194446 A1 | 10/2018 |
| WO | 2018194685 A1 | 10/2018 |
| WO | 2018197888 A1 | 11/2018 |
| WO | 2019063741 A1 | 4/2019 |
| WO | 2019076705 A1 | 4/2019 |
| WO | 2019089497 A1 | 5/2019 |
| WO | 2019094269 A1 | 5/2019 |
| WO | 2019094283 A1 | 5/2019 |
| WO | 2019094367 A1 | 5/2019 |
| WO | 2019113412 A1 | 6/2019 |
| WO | 2019136222 A1 | 7/2019 |
| WO | 2019139742 A1 | 7/2019 |
| WO | 2019140000 A1 | 7/2019 |
| WO | 2019157074 A2 | 8/2019 |
| WO | 2019182618 A1 | 9/2019 |
| WO | 2019194826 A1 | 10/2019 |
| WO | 2019209881 A1 | 10/2019 |
| WO | 2019236074 A1 | 12/2019 |
| WO | 2020007891 A1 | 1/2020 |
| WO | 2020013828 A1 | 1/2020 |
| WO | 2020068101 A1 | 4/2020 |
| WO | 2020115468 A1 | 6/2020 |
| WO | 2020146416 A2 | 7/2020 |
| WO | 2020159507 A1 | 8/2020 |
| WO | 2020237118 A1 | 11/2020 |
| WO | 2020237119 A1 | 11/2020 |
| WO | 2020237120 A1 | 11/2020 |
| WO | 2020237122 A1 | 11/2020 |
| WO | 2020237123 A1 | 11/2020 |
| WO | 2020237138 A1 | 11/2020 |
| WO | 2020237142 A1 | 11/2020 |
| WO | 2020237143 A1 | 11/2020 |
| WO | 2020237144 A1 | 11/2020 |
| WO | 2020237161 A1 | 11/2020 |
| WO | 2020237163 A1 | 11/2020 |
| WO | 2020237165 A1 | 11/2020 |
| WO | 2020237166 A1 | 11/2020 |
| WO | 2022086867 A1 | 4/2022 |
| WO | 2022086868 A1 | 4/2022 |
| WO | 2022087043 A1 | 4/2022 |
| WO | 2022087044 A1 | 4/2022 |
| WO | 2022087046 A1 | 4/2022 |
| WO | 2022087048 A1 | 4/2022 |

OTHER PUBLICATIONS

International Search Report for Appln. No. PCT/US2021/055457 mailed Jan. 27, 2022, 20 pages.
International Search Report for Appln. No. PCT/US2021/055458 mailed Jan. 27, 2022, 15 pages.
International Search Report for Appln. No. PCT/US2021/055716 mailed Mar. 22, 2022, 21 pages.
International Search Report for Appln. No. PCT/US2021/055717 mailed Dec. 20, 2021, 16 pages.
International Search Report for Appln. No. PCT/US2021/055719 mailed Jan. 18, 2022, 17 pages.
International Search Report for Appln. No. PCT/US2021/055722 mailed Jan. 3, 2022, 14 pages.
International Search Report for Appln. No. PCT/US2021/056828 mailed Feb. 23, 2022, 11 pages.
International Search Report for Appln. No. PCT/US2021/056451 mailed Apr. 4, 2022, 33 pages.
International Search Report for Appln. No. PCT/US2021/056827 mailed Feb. 11, 2022, 15 pages.
International Search Report for Appln. No. PCT/US2021/056789 mailed Jan. 18, 2022, 18 pages.
International Search Report for Appln. No. PCT/US2021/056787 mailed Aug. 2, 2022, 12 pages.
International Search Report for Appln. No. PCT/US2021/057517 mailed Sep. 6, 2022, 21 pages.

(56) References Cited

OTHER PUBLICATIONS

International Preliminary Report for Appln. No. PCT/US2021/055457 mailed May 4, 2023, 14 pages.
International Preliminary Report for Appln. No. PCT/US2021/055458 mailed May 4, 2023, 10 pages.
International Preliminary Report for Appln. No. PCT/US2021/055716 mailed May 4, 2023, 16 pages.
International Preliminary Report for Appln. No. PCT/US2021/055717 mailed May 4, 2023, 11 pages.
International Preliminary Report for Appln. No. PCT/US2021/055719 mailed May 4, 2023, 12 pages.
International Preliminary Report for Appln. No. PCT/US2021/055722 mailed May 4, 2023, 10 pages.
International Preliminary Report for Appln. No. PCT/US2021/056828 mailed May 11, 2023, 8 pages.
International Preliminary Report for Appln. No. PCT/US2021/056451 mailed May 11, 2023, 23 pages.
International Preliminary Report for Appln. No. PCT/US2021/056827 mailed May 11, 2023, 9 pages.
International Preliminary Report for Appln. No. PCT/US2021/056789 mailed May 11, 2023, 11 pages.
International Preliminary Report for Appln. No. PCT/US2021/056787 mailed May 11, 2023, 8 pages.
International Preliminary Report for Appln. No. PCT/US2021/057517 mailed May 11, 2023, 15 pages.
Shanjani "Material Spreading and Compaction in Powder-Based Solid Freeform Fabrication Methods: Mathematical Modeling" Department of Mechanical and Mechatronic Engineering, University of Waterloo, Sep. 10, 2008.
Japanese Office Action for Application No. 2023-521818 dated Feb. 16, 2020 (5 pages with English Translation).
Japanese Office Action for Application No. 2023-521819 dated Feb. 20, 2024 (5 pages with English Translation).
European Patent Office Action for Application No. 21807388.0 dated Mar. 22, 2023 (8 pages).

\* cited by examiner

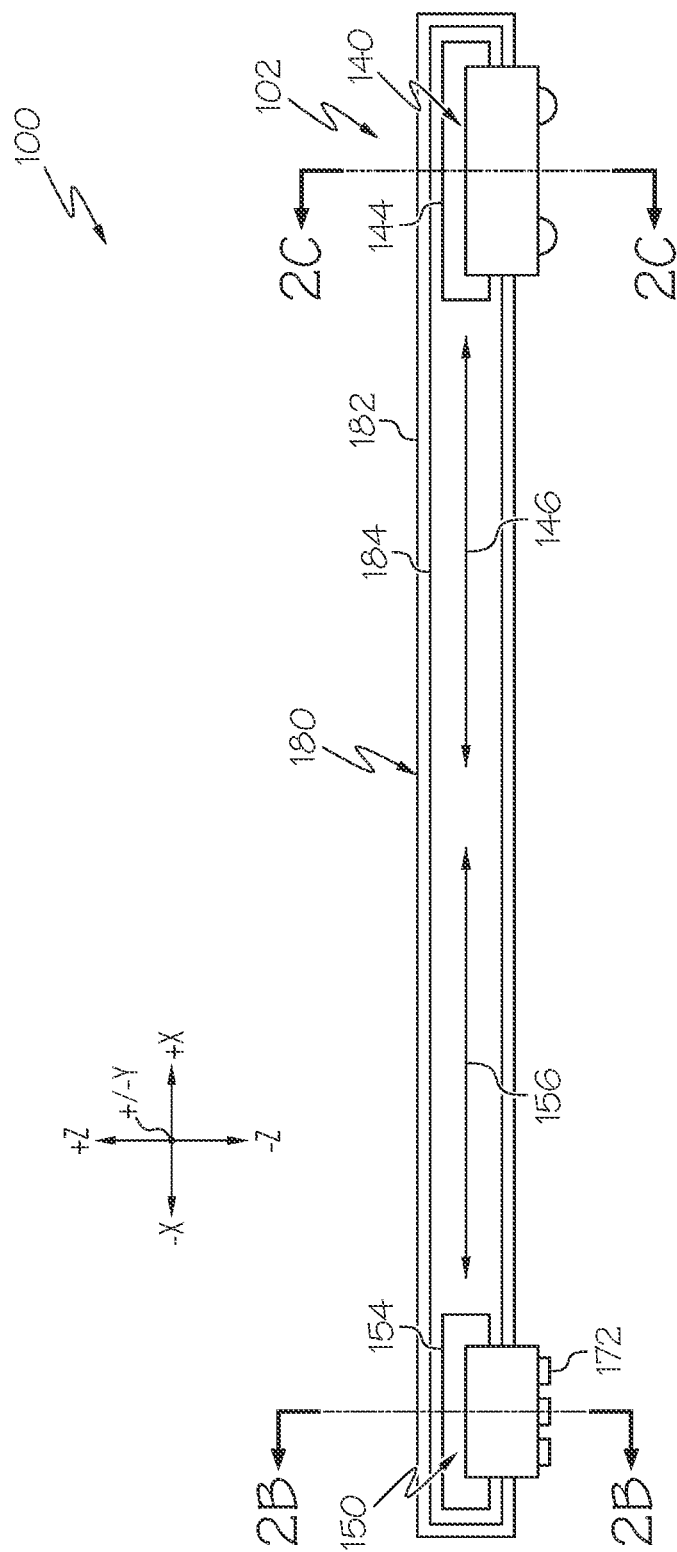

ADDITIVE MANUFACTURING APPARATUSES AND METHODS FOR USING THE SAME

CROSS REFERENCE TO RELATED APPLICATIONS

The present specification is a National Phase Entry of International Application No. PCT/US2021/056787 filed Oct. 27, 2021 entitled "ADDITIVE MANUFACTURING APPARATUSES AND METHODS FOR USING THE SAME" which claims the benefit of U.S. Provisional Patent Application Ser. No. 63/107,159 filed Oct. 29, 2020 and entitled "Additive Manufacturing Apparatuses and Method for Using the Same," the entirety of which is incorporated by reference herein.

FIELD

The present specification generally relates to additive manufacturing apparatuses and methods for using the same.

TECHNICAL BACKGROUND

Additive manufacturing apparatuses may be utilized to "build" an object from build material, such as organic or inorganic powders, in a layer-wise manner. Early iterations of additive manufacturing apparatuses were used for prototyping three-dimensional objects. However, as additive manufacturing technology has improved, there is an increased interest in utilising additive manufacturing apparatuses for large-scale commercial production of objects. One issue of scaling additive manufacturing apparatuses to commercial production is improving the throughput of additive manufacturing apparatuses to meet commercial demands.

Accordingly, a need exists for alternative additive manufacturing apparatuses and components thereof that improve manufacturing throughput.

SUMMARY

A first aspect A1 includes an additive manufacturing apparatus comprising: a chassis assembly comprising: a low voltage chassis section; a lower chassis section secured to the low voltage chassis section at a first end of the lower chassis section; an upper environmental chassis section secured to and extending over the low voltage chassis section and the lower chassis section; a high voltage chassis section secured to the upper environmental chassis section and the lower chassis section at a second end of the lower chassis section; a build receptacle carriage adjustably coupled to the lower chassis section; and a skin at least partially covering the chassis assembly, the skin comprising: a first door providing access to the low voltage chassis section and a first end of the upper environmental chassis section; a second door providing access to the high voltage chassis section; a rear panel providing access to the upper environmental chassis section; a top panel covering a top of the upper environmental chassis section; and at least one hinged door providing access to the lower chassis section.

A second aspect A2 includes an additive manufacturing apparatus of aspect A1, wherein at least one of the first door, the second door, and the top panel is perforated to allow ventilation through the skin.

A third aspect A3 includes an additive manufacturing apparatus of any preceding aspect, wherein the skin further comprises a material supply port through which powder, fluids, and air are received from a material handling system into the additive manufacturing apparatus.

A fourth aspect A4 includes an additive manufacturing apparatus of any preceding aspect, wherein the chassis further comprises a pair of machine hoisting beams coupled to the upper environmental chassis section and accessible through the skin.

A fifth aspect A5 includes an additive manufacturing apparatus of any preceding aspect, wherein: the lower chassis section comprises a pair of horizontal carriage supports each extending between the first end and the second end of the lower chassis section upon which the build receptacle carriage is disposed; and the build receptacle carriage comprises an adjustment pin that pushes against the lower chassis section to adjust a position of the build receptacle carriage between the first end and the second end of the lower chassis section along the pair of horizontal carriage supports.

A sixth aspect A6 includes an additive manufacturing apparatus of any preceding aspect, further comprising a plurality of positioning blocks configured for adjustably coupling a lift system to the build receptacle carriage, and adjusting the coupling of the lift system to the build receptacle carriage moves the lift system within the build receptacle carriage in a direction perpendicular to a longitudinal direction of the lower chassis section extending from the first end to the second end of the lower chassis section.

A seventh aspect A7 includes an additive manufacturing apparatus of any preceding aspect, further comprising: a linear motion assembly coupled to the upper environmental chassis section, the linear motion assembly comprising a linear rail defining a working axis for the additive manufacturing apparatus, wherein the rear panel provides access to the linear motion assembly; a recoat head removably coupled to the linear rail through a first linear rail carriage to move a powder material from a powder supply to a build area; a print head removably coupled to the linear rail through a second linear rail carriage to deposit a binder material in the build area; wherein the recoat head and the print head are cantilevered from the linear rail.

An eighth aspect A8 includes an additive manufacturing apparatus of aspect A7, wherein a length of the rear panel in a direction parallel to the working axis of the additive manufacturing apparatus is greater than a length of the linear motion assembly in the direction parallel to the working axis of the additive manufacturing apparatus.

A ninth aspect A9 includes an additive manufacturing apparatus of aspect A8, wherein the linear motion assembly comprises at least a pair of gussets accessible through the rear panel for lifting the linear motion assembly.

A tenth aspect A10 includes an additive manufacturing apparatus of aspects A7-A9, further comprising: a support rail coupled to each of the recoat head and the print head through a corresponding support arm; wherein the support rail extends in a direction parallel to and is spaced apart from the linear motion assembly.

An eleventh aspect A11 includes an additive manufacturing apparatus of aspect A10, wherein the support rail is coupled to a top panel of a process chamber surrounding the linear motion assembly, the recoat head, and the print head.

A twelfth aspect A12 includes an additive manufacturing apparatus of aspect A10, wherein the support rail is coupled to a working surface within the additive manufacturing apparatus.

A thirteenth aspect A13 includes an additive manufacturing apparatus of any preceding aspect, wherein the skin comprises a recess therein for removably mounting a mobile computing device.

A fourteenth aspect A14 includes an additive manufacturing apparatus of any preceding aspect, further comprising: a system panel mounted to the lower chassis section via hinges, the system panel having system components mounted on a first side and a second side of the system panel for the operation of the additive manufacturing apparatus, wherein the system panel is rotatable between a first position in which the system panel is parallel to the at least one hinged door providing access to the lower chassis section such that when the at least one hinged door is closed, the first side of the system panel is positioned between the at least one hinged door and the second side of the system panel, and a second position in which the second side of the system panel is exposed through the skin.

A fifteenth aspect A15 includes an additive manufacturing apparatus of aspect A14, wherein the system component mounted on the system panel comprise components of a pneumatic system of the additive manufacturing apparatus.

A sixteenth aspect A16 includes an additive manufacturing apparatus of any preceding aspect, further comprising: a conveyor system extending through the lower chassis section in a direction perpendicular to a length of the lower chassis section extending from the first end to the second end of the lower chassis section; and a tunnel enclosing the conveyor system, the tunnel comprising a lid that opens for access to the conveyor system.

A seventeenth aspect A17 includes a method of servicing an additive manufacturing apparatus of any preceding aspect, comprising: opening the first door to access a low voltage electrical cabinet mounted to the low voltage chassis section.

An eighteenth aspect A18 includes a method of servicing an additive manufacturing apparatus of any preceding aspect, comprising: opening the second door to access a high voltage electrical cabinet mounted to the high voltage chassis section.

A nineteenth aspect A19 includes a method of servicing an additive manufacturing apparatus of any preceding aspect, comprising: opening the at least one hinged door providing access to the lower chassis section to access one or more of a binder tank, a cleaning solution tank, and a system panel.

A twentieth aspect A20 includes a method of servicing an additive manufacturing apparatus of any preceding aspect, comprising: opening one or more of a recoat bay door and a print bay door to access a corresponding recoat bay or print bay positioned between the upper environmental chassis section and the lower chassis section.

A twenty-first aspect A21 includes a method of servicing an additive manufacturing apparatus of any preceding aspect, comprising: removing at least one of the rear panel, the top panel, and a front panel of the skin.

A twenty-second aspect A22 includes a method of servicing an additive manufacturing apparatus of any of aspects A9-A16, comprising: decoupling the print head and the recoat head from the linear motion assembly; removing the rear panel from the additive manufacturing apparatus to expose the linear motion assembly through the skin; engaging the pair of gussets of the linear motion assembly with a fork lift; and removing the linear motion assembly from the additive manufacturing apparatus.

Additional features and advantages of the additive manufacturing apparatuses described herein, the components thereof, and methods of using the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 2A schematically depicts an embodiment of an actuator assembly for an additive manufacturing apparatus according to one or more embodiments shown and described herein;

DETAILED DESCRIPTION

Figure 1:
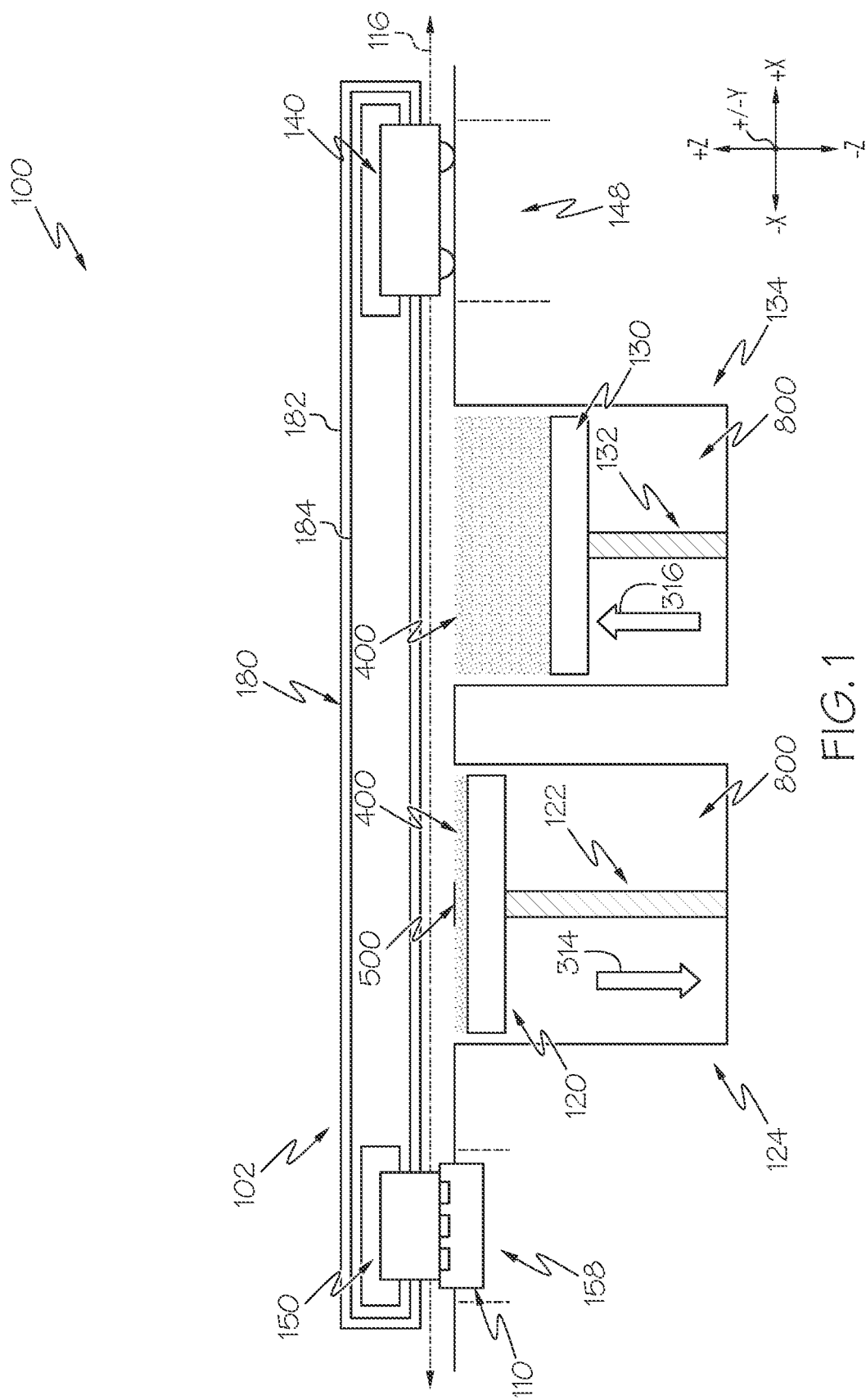
FIG. 1 schematically depicts components of an additive manufacturing apparatus according to one or more embodiments shown and described herein.

Reference will now be made in detail to embodiments of additive manufacturing apparatuses, and components thereof, examples of which are illustrated in the accompanying drawings. Whenever possible, the same reference numerals will be used throughout the drawings to refer to the same or like parts. The additive manufacturing apparatus may comprise a support chassis including a low voltage chassis section, a lower chassis section secured to the low voltage chassis section at a first end of the lower chassis section, an upper environmental chassis section secured to and extending over the low voltage chassis section and the lower chassis section, and a high voltage chassis section secured to the upper environmental chassis section and the lower chassis section at a second end of the lower chassis section. A build receptacle carriage is adjustably coupled to the lower chassis section, and a skin at least partially covers the chassis assembly. The skin includes a first door providing access to the low voltage chassis section and a first end of the upper environmental chassis section; a second door providing access to the high voltage chassis section; a rear panel providing access to the upper environmental chassis section; a top panel covering a top of the upper environmental chassis section; and at least one hinged door providing access to the lower chassis section. The chassis assembly and the skin enable various components of the additive manufacturing assembly to be supported in an organized manner while minimizing the footprint of the additive manufacturing apparatus and enabling reduced machine downtime and increased throughput by providing for improved accessibility as compared to conventional additive manufacturing processes. Various embodiments of additive manufacturing apparatuses and methods of using the same will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, upper, lower,—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, an embodiment of an additive manufacturing apparatus 100 is schematically depicted. The apparatus 100 includes a cleaning station 110, a build platform 120, and an actuator assembly 102. The apparatus 100 may optionally include a supply platform 130. The actuator assembly 102 comprises, among other elements, a recoat head 140 for distributing build material 400 and a print head 150 for depositing binder material 500. In embodiments, the recoat head 140 may further comprise an energy source for curing the binder material 500 as will be described in further detail herein. The actuator assembly 102 may be constructed to facilitate independent control of the recoat head 140 and the print head 150 along the working axis 116 of the apparatus 100. This allows for the recoat head 140 and the print head 150 to traverse the working axis 116 of the apparatus 100 in the same direction and/or in opposite directions and for the recoat head 140 and the print head 150 to traverse the working axis of the apparatus 100 at different speeds and/or the same speed. Independent actuation and control of the recoat head 140 and the print head 150, in turn, allows for at least some steps of the additive manufacturing process to be performed simultaneously thereby reducing the overall cycle time of the additive manufacturing process to less than the sum of the cycle time for each individual step. In the embodiments of the apparatus 100 described herein, the working axis 116 of the apparatus 100 is parallel to the +/−X axis of the coordinate axes depicted in the figures. It should be understood that the components of the additive manufacturing apparatus 100 traversing the working axis 116, such as the recoat head 140, the print head 150, or the like, need not be centered on the working axis 116. However, in the embodiments described herein, at least two of the components of the additive manufacturing apparatus 100 are arranged with respect to the working axis 116 such that, as the components traverse the working axis, the components could occupy the same or an overlapping volume along the working axis if not properly controlled.

In the embodiment depicted in FIG. 1, the apparatus 100 includes a cleaning station 110, a build platform 120, a supply platform 130 and an actuator assembly 102. However, it should be understood that, in other embodiments, the apparatus 100 does not include a supply platform 130, such as in embodiments where build material is supplied to the build platform 120 with, for example and without limitation, a build material hopper. In the embodiment depicted in FIG. 1, the cleaning station 110, the build platform 120, and the supply platform 130 are positioned in series along the working axis 116 of the apparatus 100 between a print home position 158 of the print head 150 located proximate an end of the working axis 116 in the —X direction, and a recoat home position 148 of the recoat head 140 located proximate an end of the working axis 116 in the +X direction. That is, the print home position 158 and the recoat home position 148 are spaced apart from one another in a horizontal direction that is parallel to the +/−X axis of the coordinate axes depicted in the figures and the cleaning station 110, the build platform 120, and the supply platform 130 are positioned therebetween. In the embodiments described herein, the build platform 120 is positioned between the cleaning station 110 and the supply platform 130 along the working axis 116 of the apparatus 100.

The cleaning station 110 is positioned proximate one end of the working axis 116 of the apparatus 100 and is co-located with the print home position 158 where the print head 150 is located or "parked" before and after depositing binder material 500 on a layer of build material 400 positioned on the build platform 120. The cleaning station 110 may include one or more cleaning sections (not shown) to facilitate cleaning the print head 150 between depositing operations. The cleaning sections may include, for example and without limitation, a soaking station containing a cleaning solution for dissolving excess binder material on the print head 150, a wiping station for removing excess binder material and excess build material from the print head 150, a jetting station for purging binder material and cleaning solution from the print head 150, a park station for maintaining moisture in the nozzles of the print head 150, or various combinations thereof. The print head 150 may be transitioned between the cleaning sections by the actuator assembly 102.

The build platform 120 is coupled to a lift system 800 comprising a build platform actuator 122 to facilitate raising and lowering the build platform 120 relative to the working axis 116 of the apparatus 100 in a vertical direction (i.e., a direction parallel to the +/−Z directions of the coordinate axes depicted in the figures). The build platform actuator 122 may be, for example and without limitation, a mechanical actuator, an electro-mechanical actuator, a pneumatic actuator, a hydraulic actuator, or any other actuator suitable for imparting linear motion to the build platform 120 in a vertical direction. Suitable actuators may include, without limitation, a worm drive actuator, a ball screw actuator, a pneumatic piston, a hydraulic piston, an electro-mechanical linear actuator, or the like. The build platform 120 and build platform actuator 122 are positioned in a build receptacle 124 located below the working axis 116 (i.e., in the −Z direction of the coordinate axes depicted in the figures) of the apparatus 100. During operation of the apparatus 100, the build platform 120 is retracted into the build receptacle 124 by action of the build platform actuator 122 after each layer of binder material 500 is deposited on the build material 400 located on build platform 120.

The supply platform 130 is coupled to a lift system 800 comprising a supply platform actuator 132 to facilitate raising and lowering the supply platform 130 relative to the working axis 116 of the apparatus 100 in a vertical direction (i.e., a direction parallel to the +/−Z directions of the coordinate axes depicted in the figures). The supply platform actuator 132 may be, for example and without limitation, a mechanical actuator, an electro-mechanical actuator, a pneumatic actuator, a hydraulic actuator, or any other actuator suitable for imparting linear motion to the supply platform 130 in a vertical direction. Suitable actuators may include, without limitation, a worm drive actuator, a ball screw actuator, a pneumatic piston, a hydraulic piston, an electro-mechanical linear actuator, or the like. The supply platform 130 and supply platform actuator 132 are positioned in a supply receptacle 134 located below the working axis 116 (i.e., in the −Z direction of the coordinate axes depicted in the figures) of the apparatus 100. During operation of the apparatus 100, the supply platform 130 is raised relative to the supply receptacle 134 and towards the working axis 116 of the apparatus 100 by action of the supply platform actuator 132 after a layer of build material 400 is distributed from the supply platform 130 to the build platform 120, as will be described in further detail herein.

Referring now to FIGS. 1 and 2A, FIG. 2A schematically depicts the actuator assembly 102 of the additive manufacturing apparatus 100 of FIG. 1. The actuator assembly 102 generally comprises the recoat head 140, the print head 150, a recoat head actuator 144, a print head actuator 154, and a support 182. In the embodiments described herein, the support 182 extends in a horizontal direction (i.e., a direction parallel to the +/−X direction of the coordinate axes depicted in the figures) parallel to the working axis 116 (FIG. 1) of the apparatus 100. When the actuator assembly 102 is assembled over the cleaning station 110, the build platform 120, and the supply platform 130 as depicted in FIG. 1, the support 182 extends in a horizontal direction from at least the cleaning station 110 to beyond the supply platform 130.

In one embodiment, the support 182 is a side of a rail 180 that extends in a horizontal direction. For example, in one embodiment, the rail 180 may be rectangular or square in vertical cross section (i.e., a cross section in the Y-Z plane of the coordinate axes depicted in the figures) with a side surface of the rectangle or square forming the support 182. However, it should be understood that other embodiments are contemplated and possible. For example and without limitation, the rail 180 may have other cross sectional shapes, such as octagonal or the like, with the support 182 being one surface of facet of the rail 180. In embodiments, the support 182 is positioned in a vertical plane (e.g., a plane parallel to the X-Z plane of the coordinate axes depicted in the figures). However, it should be understood that, in other embodiments, the support 182 is positioned in a plane other than a vertical plane.

In the embodiments described herein, the recoat head actuator 144 and the print head actuator 154 are coupled to the support 182.

Figure 2C:
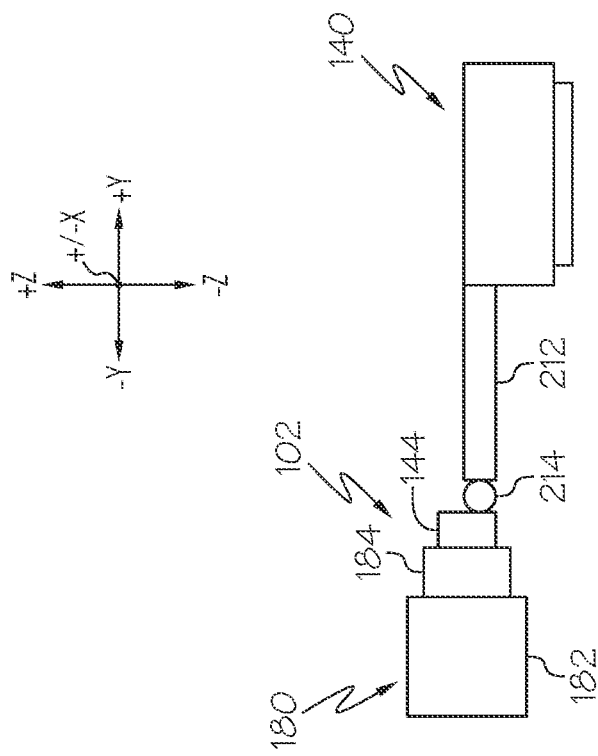
FIG. 2C schematically depicts a cross section of the actuator assembly of FIG. 2A.
Figure 2B:
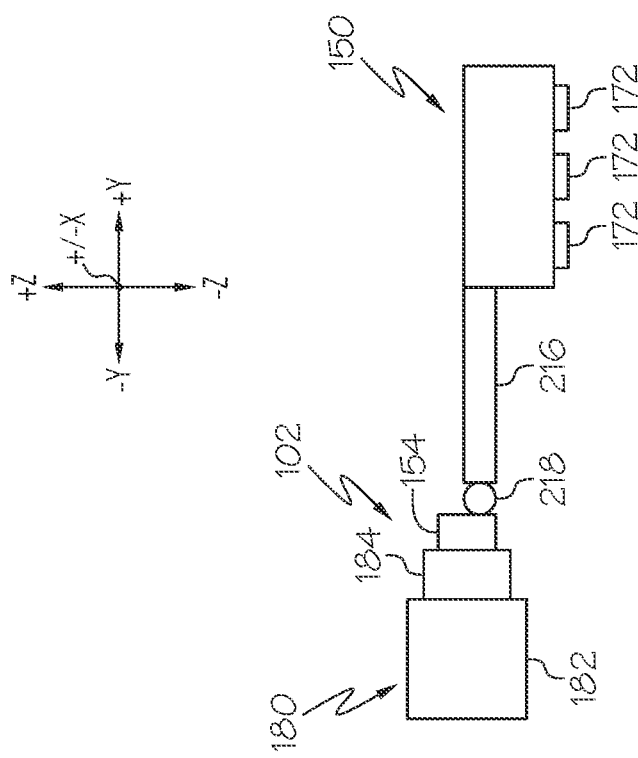
FIG. 2B schematically depicts a cross section of the actuator assembly of FIG. 2A.

In the embodiments described herein, the recoat head actuator 144 is bi-directionally actuatable along a recoat motion axis 146 and the print head actuator 154 is bi-directionally actuatable along a print motion axis 156. That is, the recoat motion axis 146 and the print motion axis 156 define the axes along which the recoat head actuator 144 and the print head actuator 154 are actuatable, respectively. In embodiments, the recoat head actuator 144 and the print head actuator 154 are bi-directionally actuatable independent of one another. The recoat motion axis 146 and the print motion axis 156 extend in a horizontal direction and are parallel with the working axis 116 (FIG. 1) of the apparatus 100. In the embodiments described herein, the recoat motion axis 146 and the print motion axis 156 are co-linear. With this configuration, the recoat head 140 and the print head 150 may occupy the same space (or portions of the same space) along the working axis 116 of the apparatus 100 at different times because the recoat motion axis 146 and the print motion axis 156 lie along the same line. In the embodiment of the actuator assembly 102 depicted in FIGS. 2A-2C, the recoat motion axis 146 and the print motion axis 156 are located in the same vertical plane. In embodiments where the support 182 is positioned in a vertical plane, the recoat motion axis 146 and the print motion axis 156 are located a vertical plane that is parallel to the vertical plane of the support 182, as depicted in FIGS. 2A-2C. However, it should be understood that other embodiments are contemplated and possible, such as embodiments in which the recoat motion axis 146 and the print motion axis 156 are located in a vertical plane that is non-parallel with the plane of the support 182.

In the embodiments described herein, the recoat head actuator 144 and the print head actuator 154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In one particular embodiment, the recoat head actuator 144 and the print head actuator 154 are linear actuators manufactured by Aerotech® Inc. of Pittsburgh, Pennsylvania, such as the PRO225LM Mechanical Bearing, Linear Motor Stage.

For example, the actuator assembly 102 may comprise a guide 184 affixed to the support 182 of the rail 180. The recoat head actuator 144 and the print head actuator 154 may be moveably coupled to the rail 180 such that the recoat head actuator 144 and the print head actuator 154 can independently traverse a length of the guide 184. In embodiments, the motive force traversing the recoat head actuator 144 and the print head actuator 154 is supplied by direct-drive linear motors, such as brushless servomotors, for example.

In embodiments, the recoat head actuator 144, the print head actuator 154, and the guide 184 may be a cohesive sub-system that is affixed to the rail 180, such as when the recoat head actuator 144 and the print head actuator 154 are similar to the PRO225LM Mechanical Bearing, Linear Motor Stages, for example. However, it should be understood that other embodiments are contemplated and possible, such as embodiments where the recoat head actuator 144 and the print head actuator 154 comprise multiple components that are individually assembled onto the rail 180 to form the recoat head actuator 144 and the print head actuator 154, respectively.

Still referring to FIGS. 2A-2C, the recoat head 140 is coupled to the recoat head actuator 144 such that the recoat head 140 is situated proximate the working axis 116 (FIG. 1) of the additive manufacturing apparatus 100. Thus, bi-directional actuation of the recoat head actuator 144 along the recoat motion axis 146 affects bi-directional motion of the recoat head 140 on the working axis 116 of the additive manufacturing apparatus 100. In the embodiment of the actuator assembly 102 depicted in FIGS. 2A-2C, the recoat head 140 is coupled to the recoat head actuator 144 with strut 212 such that the recoat head 140 is cantilevered from the support 182 and positioned on the working axis 116 (FIG. 1) of the additive manufacturing apparatus 100. Cantilevering the recoat head 140 from the support 182 allows the recoat head actuator 144 and the guide 184 to be spaced apart from, for example, the build platform 120 of the additive manufacturing apparatus 100 thereby reducing the likelihood that the recoat head actuator 144, the guide 184, and associate electrical components will be fouled or otherwise contaminated with build material 400. This increases the maintenance interval for the recoat head actuator, increases the service life of the recoat head actuator, reduces machine downtime, and reduces build errors due to fouling of the recoat head actuator 144. In addition, spacing the recoat head actuator 144 apart from the build platform 120 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the recoat head 140 may be fixed in directions orthogonal to the recoat motion axis 146 and the working axis 116 (i.e., fixed along the +/−Z axis and/or fixed along the +/−Y axis).

In embodiments, the recoat head 140 may be pivotally coupled to the recoat head actuator 144. For example and without limitation, in the embodiment of the actuator assembly 102 depicted in FIGS. 2A-2C, the strut 212 is coupled to the recoat head 140 and pivotally coupled to the recoat head actuator 144 at pivot point 214. This allows the recoat head 140 to be pivoted with respect to the recoat head actuator 144 away from the working axis 116 (FIG. 1) of the apparatus 100 to facilitate, for example, maintenance or removal of components of the apparatus positioned below the recoat head 140 (e.g., the build receptacle, supply receptacle, or the like). In embodiments, the pivot point 214 may include an actuator, such as a motor or the like, to facilitate automated pivoting of the recoat head 140. In embodiments, a separate actuator (not depicted) may be provided between the recoat head 140 and the recoat head actuator 144 to facilitate automated pivoting of the recoat head 140. While FIG. 2C depicts the pivot point 214 positioned between the strut 212 and the recoat head actuator 144, it should be understood that other embodiments are contemplated and possible, such as embodiments where the pivot point 214 is positioned between the strut 212 and the recoat head 140.

Still referring to FIGS. 2A-2C, the print head 150 is coupled to the print head actuator 154 such that the print head 150 is situated proximate the working axis 116 (FIG. 2) of the additive manufacturing apparatus 100. Thus, bi-directional actuation of the print head actuator 154 along the print motion axis 156 affects bi-directional motion of the print head 150 on the working axis 116 of the additive manufacturing apparatus 100. In the embodiment of the actuator assembly 102 depicted in FIGS. 2A-2C, the print head 150 is coupled to the print head actuator 154 with strut 216 such that the print head 150 is cantilevered from the support 182 and positioned on the working axis 116 (FIG. 1) of the additive manufacturing apparatus 100. Cantilevering the print head 150 from the support 182 allows the print head actuator 154 and the guide 184 to be spaced apart from, for example, the build platform 120 of the additive manufacturing apparatus 100 thereby reducing the likelihood that the print head actuator 154, the guide 184, and associate electrical components will be fouled or otherwise contaminated with build material 400. This increases the maintenance interval for the print head actuator, increases the service life of the print head actuator, reduces machine downtime, and reduces build errors due to fouling of the print head actuator 154. In addition, spacing the print head actuator 154 apart from the build platform 120 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the print head 150 may be fixed in directions orthogonal to the recoat motion axis 146 and the working axis 116 (i.e., fixed along the +/−Z axis and/or fixed along the +/−Y axis).

In embodiments, the print head 150 may be pivotally coupled to the print head actuator 154. For example and without limitation, in the embodiment of the actuator assembly 102 depicted in FIGS. 2A-2C, the strut 216 is coupled to the print head 150 and pivotally coupled to the print head actuator 154 at pivot point 218. This allows the print head 150 to be pivoted with respect to the print head actuator 154 away from the working axis 116 (FIG. 1) of the apparatus 100 to facilitate, for example, maintenance or removal of components of the apparatus positioned below the print head 150 (e.g., the build receptacle, supply receptacle, or the like). In embodiments, the pivot point 218 may include an actuator, such as a motor or the like, to facilitate automated pivoting of the print head 150. In embodiments, a separate actuator (not depicted) may be provided between the print head 150 and the print head actuator 154 to facilitate automated pivoting of the print head 150. While FIG. 2B depicts the pivot point 218 positioned between the strut 216 and the print head actuator 154, it should be understood that other embodiments are contemplated and possible, such as embodiments where the pivot point 218 is positioned between the strut 216 and the print head 150.

In embodiments, the recoat head actuator 144 and the print head actuator 154 overlap over the build receptacle 124. As such, the range of motion of the recoat head actuator 144 (and attached recoat head 140) and the print head actuator 154 (and attached print head 150) also overlap over the build receptacle 124. In embodiments, the range of motion of the recoat head actuator (and attached recoat head 140) is greater than the range of motion of the print head actuator 154 (and attached print head 150). This is true when, for example, the apparatus 100 includes a supply receptacle 134 positioned between the build receptacle 124 and the recoat home position 148. However, it should be understood that other embodiments are contemplated and possible. For example, in embodiments (not depicted) the recoat head actuator 144 and the print head actuator 154 may overlap along the entire length of the working axis 116 of the apparatus 100. In these embodiments, the range of motion of the recoat head actuator 144 (and attached recoat head 140) and the print head actuator 154 (and attached print head 150) are co-extensive over the working axis 116 of the apparatus 100.

As noted above, in the embodiments described herein the recoat head 140 and the print head 150 are both located on the working axis 116 of the apparatus 100. As such, the movements of the recoat head 140 and the print head 150 on the working axis 116 occur along the same axis and are thus co-linear. With this configuration, the recoat head 140 and the print head 150 may occupy the same space (or portions of the same space) along the working axis 116 of the apparatus 100 at different times during a single build cycle. The recoat head 140 and the print head 150 may be moved along the working axis 116 of the apparatus 100 simultaneously in a coordinated fashion, in the same direction and/or in opposing directions, at the same speeds or different speeds. This, in turn, allows for individual steps of the additive manufacturing process, such as the distributing step (also referred to herein as the recoating step), the depositing step (also referred to herein as the printing step), the curing (or heating) step, and/or the cleaning step to be performed with overlapping cycle times. For example, the distributing step may be initiated while the cleaning step is being completed; the depositing step may be initiated while the distributing step in completed; and/or the cleaning step may be initiated while the distributing step is being completed. This may reduce the overall cycle time of the additive manufacturing apparatus 100 to less than the sum of the distributing cycle time (also referred to herein as the recoat cycle time), the depositing cycle time (also referred to herein as the print cycle time), and/or the cleaning cycle time.

Other embodiments of an actuator assembly (not shown) may be implemented in the embodiments of the additive manufacturing apparatuses 100 depicted in FIG. 1, for example, as an alternative to the actuator assembly 102. As such, it should be understood that other embodiments of the actuator assembly may be utilized to build an object on the build platform 120 in a similar manner as described herein with respect to FIGS. 1-2C.

Referring now to FIGS. 1-2C, in the embodiments described herein, the print head 150 may deposit the binder material 500 on a layer of build material 400 distributed on the build platform 120 through an array of nozzles 172 located on the underside of the print head 150 (i.e., the surface of the print head 150 facing the build platform 120). In embodiments, the array of nozzles 172 are spatially distributed in the XY plane of the coordinate axes depicted in the figures. In some embodiments, the print heads may also define the geometry of the part being built. In embodiments, the nozzles 172 may be piezoelectric print nozzles and, as such, the print head 150 is a piezo print head. In alternative embodiments, the nozzles 172 may be thermal print nozzle s and, as such, the print head 150 is a thermal print head. In alternative embodiments, the nozzle s 172 may be spray nozzles.

In addition to the nozzles 172, in some embodiment, the print head 150 may further comprise one or more sensors (not depicted) for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus.

Alternatively or additionally, the print head 150 may comprise at least one energy source (not depicted). The energy source may emit a wavelength or a range of wavelengths of electromagnetic radiation suitable for curing (or at least initiating curing) the binder material 500 deposited on the build material 400 distributed on the build platform 120. For example, the energy source may comprise an infrared heater or an ultraviolet lamp which emit wavelengths of infrared or ultraviolet electromagnetic radiation suitable for curing the binder material 500 previously deposited on the layer of build material 400 distributed on the build platform 120. In instances where the energy source is an infrared heater, the energy source may also preheat the build material 400 as it is distributed from the supply platform 130 to the build platform 120 that may assist in expediting the curing of subsequently deposited binder material 500.

As noted herein, the recoat head 140 is used in the additive manufacturing apparatus 100 to distribute build material 400 and, more specifically, to distribute build material 400 from the supply platform 130 to the build platform 120. That is, the recoat head 140 is used to "recoat" the build platform 120 with build material 400. It is contemplated that the recoat head 140 may include at least one of a roller, blade, or wiper to facilitate the distribution of build material 400 from the supply platform 130 to the build platform 120.

In embodiments, the recoat head 140 may further comprise at least one energy source. For example, in embodiments, the recoat head 140a includes a two energy sources (not shown). In these embodiments, the energy source(s) may emit a wavelength or a range of wavelengths of electromagnetic radiation suitable for curing (or at least initiating curing) the binder material 500 deposited on the build material 400 distributed on the build platform 120. For example, the energy source(s) may comprise an infrared heater or an ultraviolet lamp which emit wavelengths of infrared or ultraviolet electromagnetic radiation, respectively, suitable for curing the binder material 500 previously deposited on the layer of build material 400 distributed on the build platform 120. In instances where the energy sources are infrared heaters, the energy sources may also preheat the build material 400 as it is distributed from the supply platform 130 to the build platform 120 that may assist in expediting the curing of subsequently deposited binder material 500. It should be understood that the recoat head 140a may comprise a single energy source.

In some embodiments, the recoat head 140 may further comprise at least one sensor 171, such as at least one sensor 171 for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus.

Figure 7:
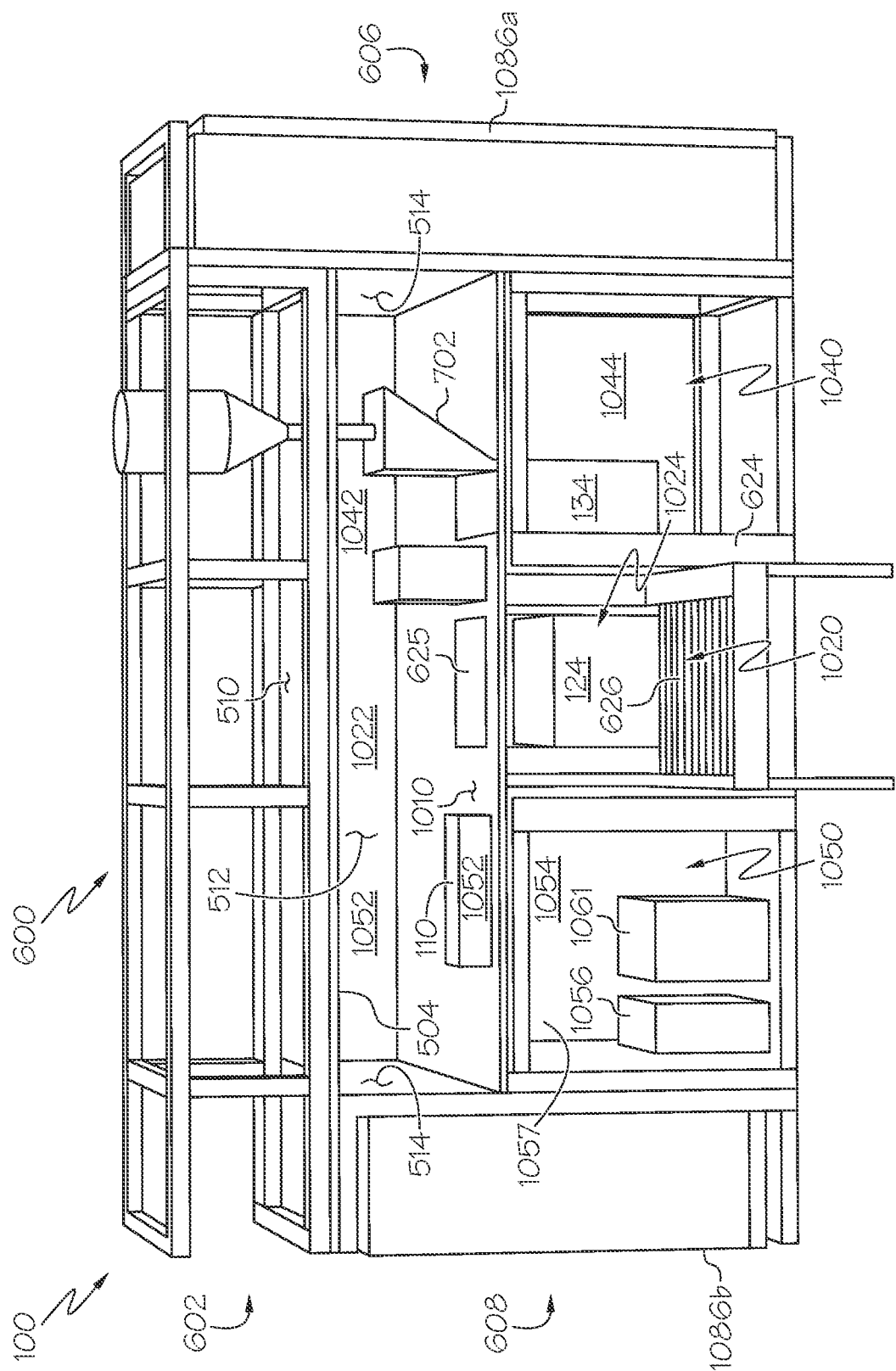
FIG. 7 schematically depicts an additive manufacturing apparatus including the support chassis of FIG. 6 according to one or more embodiments shown and described herein.

In embodiments, a process chamber encloses the actuator assembly 102 and defines an enclosed area in which an object is built. A cross section of an example process chamber is shown in FIG. 5B. FIG. 7 also shows the process chamber within a support chassis 600, with the front panel 508 removed. In various embodiments, the process chamber includes a top panel 510 that is coupled to each of a rear panel 512 (to which the rail 180 of the actuator assembly is mounted) and a front panel 508 (to which upper access panels 1060, 1070 are hingedly coupled, as discussed below). The top panel 510 is further parallel to a working surface 1010, which is also coupled to the rear panel 512 and the front panel 508. An end panel 514 (FIG. 7) is secured to first and second ends of the top panel 510, the rear panel 512, the front panel 508, and the working surface 1010 to define an enclosed space, herein referred to as the process chamber. In embodiments, the process chamber can provide a sealable environment around the print head 150 and recoat head 140. In embodiments, the panels of the process chamber can be, for example, aluminum or other metal panels that provide mechanical support for various components within the process chamber. The various panels making up the process chamber can, for example, be coupled together using bolts, rivets, welding, or the like, or may be formed from one or more common pieces of material. In various embodiments, one or more of the panels of the process chamber can include an aperture through which one or more other components of the additive manufacturing apparatus 100 may be coupled to the process chamber. For example, as shown in FIG. 7, the working surface 1010 includes an aperture through which the cleaning station 110 extends, an aperture through which the supply receptacle 134 introduces build material to the process chamber, and an aperture through a build receptacle 124 passes for providing the build surface. Accordingly, it is contemplated that seals and/or lids about each aperture can be used to maintain a seal between the process chamber and the external environment through the apertures.

Figure 3:
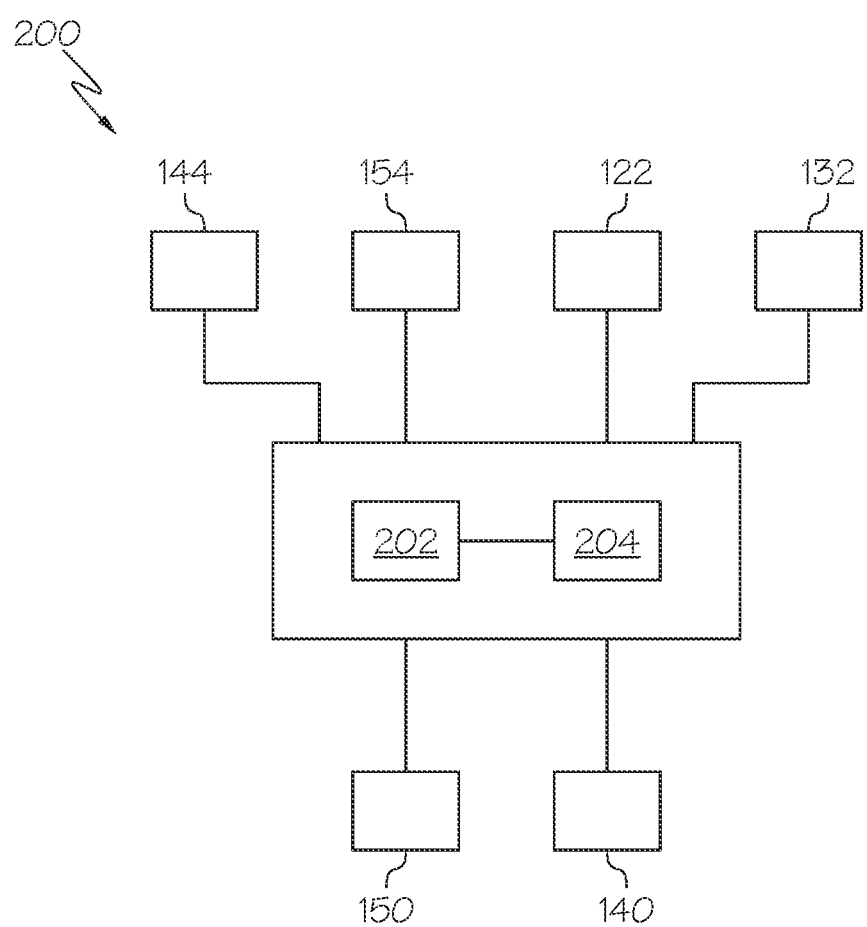
FIG. 3 schematically depicts a portion of control system for an additive manufacturing apparatus according to one or more embodiments shown and described herein.

Referring now to FIGS. 1 and 3, FIG. 3 schematically depicts a portion of a control system 200 for controlling the additive manufacturing apparatus 100 of FIG. 1 with an actuator assembly as depicted in FIGS. 2A-2C. The control system 200 is communicatively coupled to the recoat head actuator 144, the print head actuator 154, the build platform actuator 122, and the supply platform actuator 132. The control system 200 may also be communicatively coupled to the print head 150 and the recoat head 140. In embodiments where additional accessories or components are included, such as process accessories, process accessory actuators, and sensors (not depicted), the control system 200 may also be communicatively coupled to the additional components. In the embodiments described herein, the control system 200 comprises a processor 202 communicatively coupled to a memory 204. The processor 202 may include any processing component(s), such as a central processing unit or the like, configured to receive and execute computer readable and executable instructions stored in, for example, the memory 204. In the embodiments described herein, the processor 202 of the control system 200 is configured to provide control signals to (and thereby actuate) the recoat head actuator 144, the print head actuator 154, the build platform actuator 122, the supply platform actuator 132, and any additional components (when included). The processor 202 may also be configured to provide control signals to (and thereby actuate) the print head 150 and the recoat head 140. The control system 200 may also be configured to receive signals from one or more sensors of the recoat head 140 and, based on these signals, actuate one or more of the recoat head actuator 144, the print head actuator 154, the build platform actuator 122, the supply platform actuator 132, the print head 150, and/or the recoat head 140.

In the embodiments described herein, the computer readable and executable instructions for controlling the additive manufacturing apparatus 100 are stored in the memory 204 of the control system 200. The memory 204 is a non-transitory computer readable memory. The memory 204 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

The operation of the additive manufacturing apparatus 100 will now be described in further detail with specific reference to FIGS. 1, 3, and 2A-2C.

Referring to FIG. 1, the additive manufacturing apparatus 100 is schematically depicted at initiation of a build cycle. The phrase "build cycle," as used herein, refers to the process of building a single layer of an object on the build platform 120. In the embodiments described herein, the "build cycle" may include one iteration each of raising the supply platform 130, lowering the build platform 120, distributing a new layer of build material 400 from the supply platform 130 to the build platform 120, depositing binder material 500 on the new layer of build material 400 distributed on the build platform 120, and optionally the cleaning of the print head 150.

In describing the operation of the additive manufacturing apparatus 100, specific reference will be made herein to build material 400 and binder material 500. The build material generally comprises a powder material that is spreadable or flowable. Categories of suitable powder material include, without limitation, dry powder material and wet powder material (e.g., a powder material entrained in a slurry). In embodiments, the build material may be capable of being bound together with the binder material. In embodiments, the build material may also be capable of being fused together, such as by sintering. In embodiments, the build material may be an inorganic powder material including, for example and without limitation, ceramic powders, metal powders, glass powders, carbon powder, sand, cement, calcium phosphate powder, and various combinations thereof. In embodiments, the build material may comprise an organic powder material including, for example and without limitation, plastic powders, polymer powders, soap, powders formed from foodstuff (i.e., edible powders), and various combinations thereof. In some embodiments, the build material may be (or include) pharmaceutically active components, such as when the build material is or contains a pharmaceutical. In embodiments, the build material may be a combination of inorganic powder material and organic powder material.

The build material may be uniform in size or non-uniform in size. In embodiments, the build material may have a powder size distribution such as, for example and without limitation, a bi-modal or tri-modal powder size distribution. In embodiments, the build material may be, or may include, nanoparticles.

The build material may be regularly or irregularly shaped, and may have different aspect ratios or the same aspect ratio. For example, the build material may take the form of small spheres or granules, or may be shaped like small rods or fibers.

In embodiments, the build material can be coated with a second material. For example and without limitation, the build material may be coated with a wax, a polymer, or another material that aids in binding the build material together (in conjunction with the binder). Alternatively or additionally, the build material may be coated with a sintering agent and/or an alloying agent to promote fusing the build material.

The binder material may comprise a material which is radiant-energy curable and which is capable of adhering or binding together the build material when the binder material is in the cured state. The term "radiant-energy curable," as used herein, refers to any material that solidifies in response to the application of radiant energy of a particular wavelength and energy. For example, the binder material may comprise a known photopolymer resin containing photo-initiator compounds functioning to trigger a polymerization reaction, causing the resin to change from a liquid state to a solid state. Alternatively, the binder material may comprise a material that contains a solvent that may be evaporated out by the application of radiant energy. The uncured binder material may be provided in solid (e.g., granular) form, liquid form including a paste or slurry, or a low viscosity solution compatible with print heads. The binder material may be selected to have the ability to out-gas or burn off during further processing, such as during sintering of the build material. In embodiments, the binder material may be as described in U.S. Patent Publication No. 2018/0071820 entitled "Reversible Binders For Use In Binder Jetting Additive Manufacturing Techniques" and assigned to General Electric Corporation, Schenectady, NY. However, it should be understood that other binder materials are contemplated and possible, including combinations of various binder materials.

Referring initially to FIG. 1, at initiation of the build cycle, the control system 200 sends a control signal to the supply platform actuator 132 that actuates the supply platform actuator 132 in the upward vertical direction (i.e., in the +Z direction of the coordinate axes depicted in the figures) as indicated by arrow 316, thereby moving the supply platform 130, and the build material 400 positioned thereon, in the upward vertical direction towards the working axis 116 of the apparatus 100. The supply platform 130 is moved in the upward vertical direction by an amount sufficient to position a predetermined amount of the build material 400 in the pathway of the recoat head 140 as it traverses over the working axis 116 of the apparatus 100. While FIG. 1 schematically depicts an initiation of a build cycle in which binder material 500 is already present on a layer of build material 400 (such as on a previously distributed layer of build material 400), it should be understood that the initiation of the build cycle may occur without any build material 400 or binder material 500 disposed on the build platform 120.

Figure 4A:
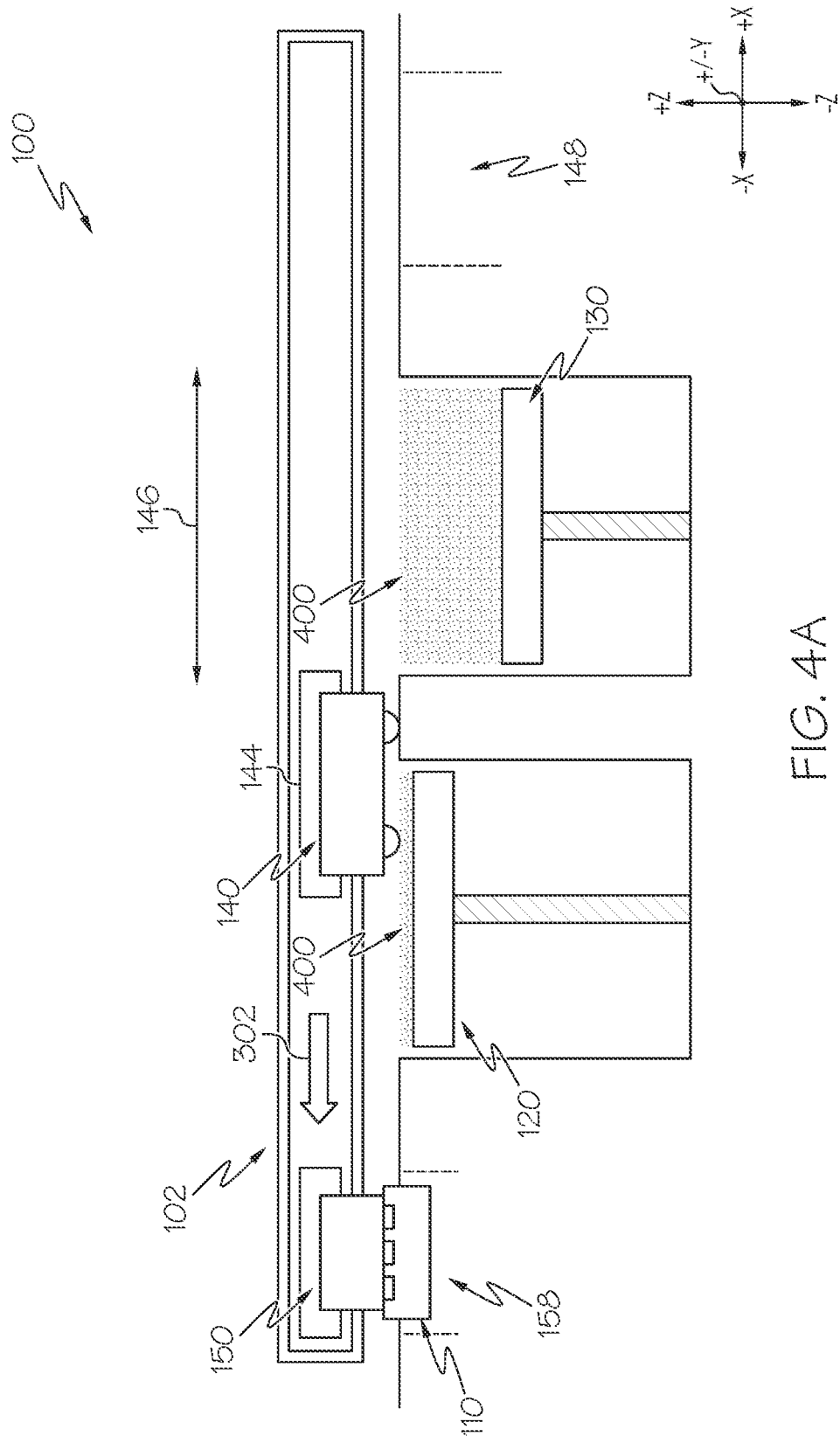
FIG. 4A schematically depicts an additive manufacturing apparatus comprising the actuator assembly of FIG. 2A in use according to one or more embodiments shown and described herein.

Referring now to FIGS. 1 and 4A, as the supply platform 130 is raised (i.e., during the platform cycle time Tsp), the control system 200 also sends a control signal to the recoat head actuator 144 causing the recoat head actuator 144 to advance the recoat head 140 from the recoat home position 148 towards the print home position 158 along the working axis 116 in a first recoat direction, as indicated by arrow 302, at a recoat head advance rate. This is accomplished by actuating the recoat head actuator 144 along the recoat motion axis 146 in the —X direction of the coordinate axes depicted in the figures. The advance of the recoat head 140 is coordinated with the upward vertical motion of the supply platform 130 such that the predetermined amount of build material 400 is positioned in the pathway of the recoat head 140 prior to the recoat head 140 traversing over the supply platform 130. As the recoat head 140 traverses over the supply platform 130 towards the build platform 120, the recoat head 140 moves (i.e., distributes) build material 400 from the supply platform 130 to the build platform 120, thereby distributing a new layer of build material 400 on the build platform 120, as indicated in FIG. 4A.

In embodiments, the recoat head advance rate may vary as the recoat head 140 is traversed over the working axis 116 of the apparatus 100 in the direction indicated by arrow 302. For example, the recoat head advance rate may comprise an initial recoat head advance rate prior to traversing over the supply platform 130 from the recoat home position 148 and a distribution advance rate as the recoat head 140 traverses over the supply platform 130 and the build platform 120. In embodiments, the recoat head advance rate may be different (e.g., faster) between the supply platform 130 and the build platform 120. In embodiments, the distribution advance rate may be less than the initial recoat head advance rate. This may promote uniformity in the layer of build material 400 distributed on the build platform 120 from the supply platform 130 and reduce defects in the object.

Figure 4B:
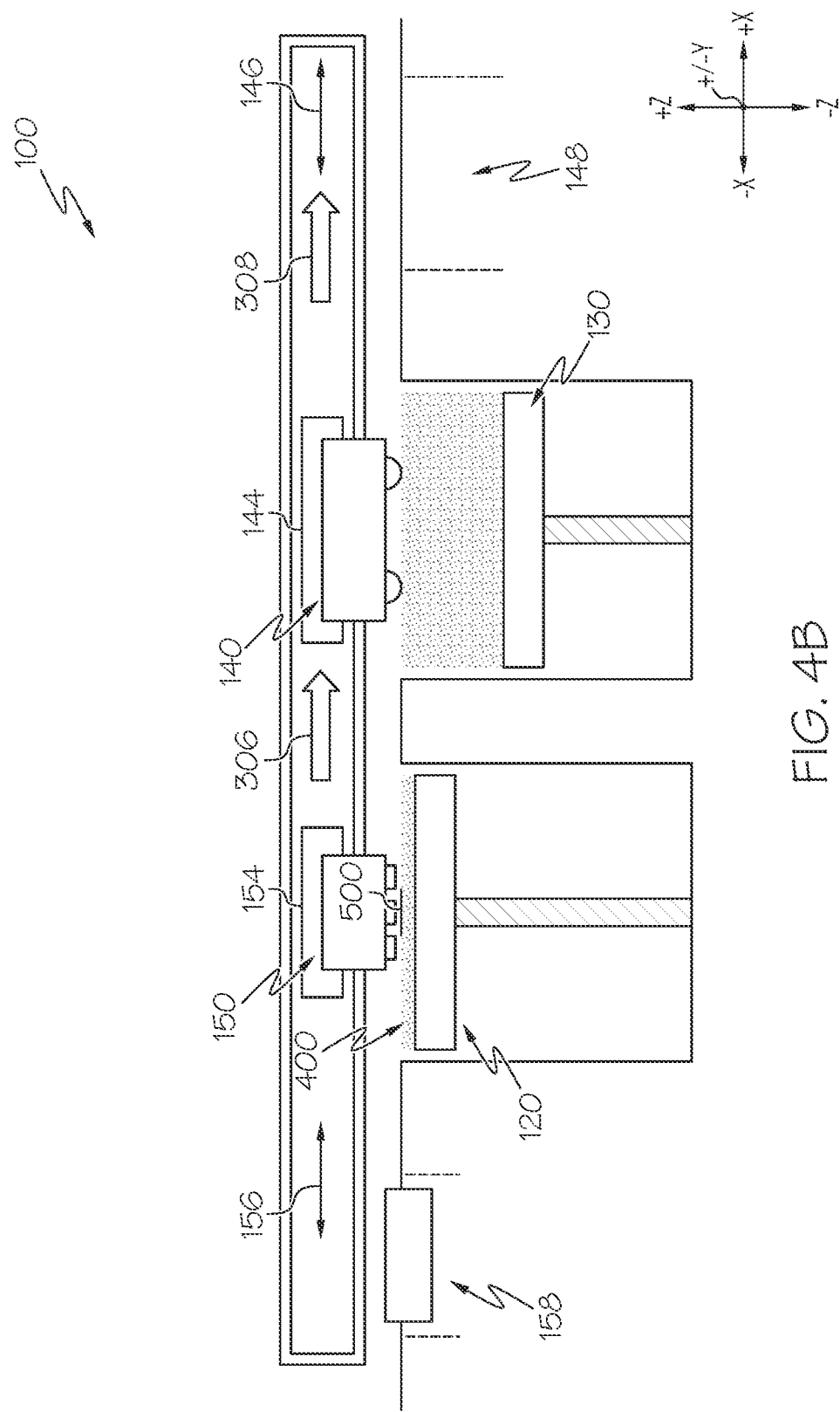
FIG. 4B schematically depicts an additive manufacturing apparatus comprising the actuator assembly of FIG. 2A in use according to one or more embodiments shown and described herein.

Referring now to FIG. 4B, after the new layer of build material 400 is distributed on the build platform 120, the control system 200 sends a control signal to the recoat head actuator 144 causing the recoat head actuator 144 to return the recoat head 140 to the recoat home position 148 along the working axis 116 (FIG. 1) in a second recoat direction opposite the first recoat direction, as indicated by arrow 308, at a recoat head return rate. In embodiments, the recoat head return rate may be greater than or equal to the recoat head advance rate. In embodiments, where the recoat head advance rate comprises an initial recoat head advance rate and a distribution advance rate as described herein, the recoat head return rate may be greater than the distribution advance rate and greater than or equal to the initial recoat head advance rate. Return of the recoat head 140 to the recoat home position is accomplished by actuating the recoat head actuator 144 along the recoat motion axis 146 in the +X direction of the coordinate axes depicted in the figures.

Figure 4C:
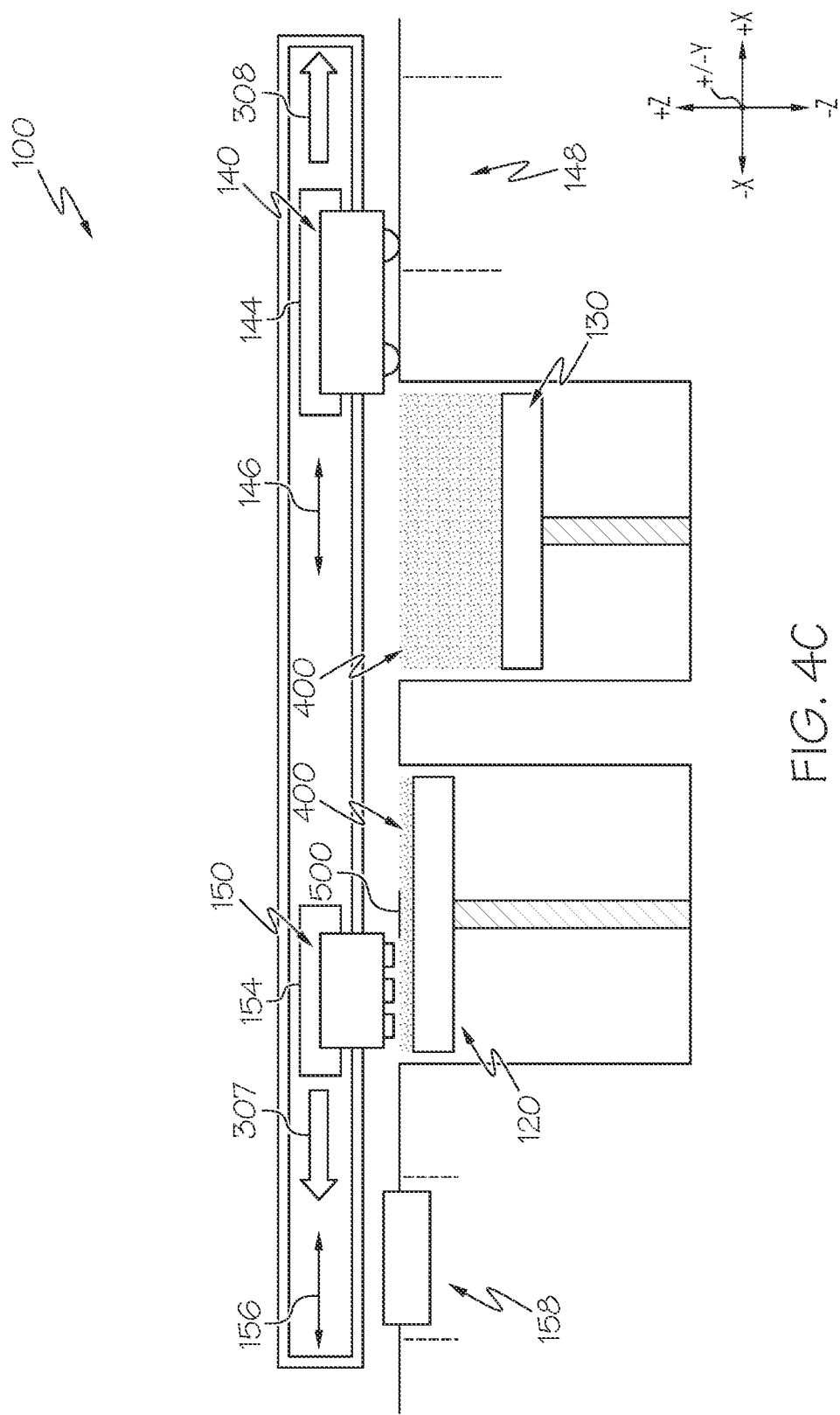
FIG. 4C schematically depicts an additive manufacturing apparatus comprising the actuator assembly of FIG. 2A in use according to one or more embodiments shown and described herein.

Still referring to FIG. 4B, as the recoat head 140 is returned to the recoat home position 148, the control system 200 sends a control signal to the print head actuator 154 causing the print head actuator 154 to advance the print head 150 from the print home position 158 towards the recoat home position 148 along the working axis 116 (FIG. 1) in a first print direction opposite the first recoat direction, as indicated by arrow 306 of FIG. 4B, at a print head advance rate. This is accomplished by actuating the print head actuator 154 along the print motion axis 156 in the +X direction of the coordinate axes depicted in the figures. As shown in FIG. 4B, both the recoat head 140 and the print head 150 are in motion along the working axis 116 (FIG. 1) of the apparatus 100 simultaneously. The recoat head 140 and the print head 150 may be in motion simultaneously along the working axis 116 (FIG. 1) of the apparatus 100 in the same direction, as depicted in FIG. 4B, or in opposite directions, as depicted in FIG. 4C. Further, the recoat head 140 and the print head 150 may be in motion simultaneously along the working axis 116 (FIG. 1) of the apparatus 100 at different speeds or at the same speed.

As the print head 150 traverses over the build platform 120 in the direction indicated by arrow 306, the control system 200 sends a signal to the print head 150 causing the print head 150 to deposit a layer of binder material 500 in a predetermined pattern on the layer of build material 400 positioned on the build platform 120, as depicted in FIG. 4B. The predetermined pattern generally corresponds to a horizontal cross section of the object being built on the build platform 120. In embodiments, the print head 150 deposits the binder material 500 in a pattern corresponding to a first portion of the predetermined pattern on the layer of build material 400 positioned on the build platform 120 as the print head 150 traverses over the build platform 120 in the direction indicated by arrow 306 in FIG. 4B. In these embodiments, the print head 150 deposits binder material 500 in a pattern corresponding to a second portion of the predetermined pattern on the layer of build material 400 positioned on the build platform 120 as the print head 150 traverses over the build platform 120 in the direction indicated by arrow 307 in FIG. 4C when returning to the print home position 158. As the print head 150 deposits the binder material 500 in a pattern corresponding to the second portion of the predetermined pattern, the print head 150 may be advanced along the working axis 116 (FIG. 1) of the apparatus 100 in the direction indicated by arrow 307 at a deposition return rate. In embodiments, the deposition return rate may be equal to the deposition advance rate. As shown in FIG. 4C, the print head 150 and the recoat head 140 may be in motion simultaneously along the working axis 116 (FIG. 1) of the apparatus 100 in opposite directions, as indicated by arrows 307 and 308. In embodiments, the second portion of the predetermined pattern may overlap or at least partially overlap with the first portion of the predetermined pattern. Depositing the binder material 500 on the layer of build material 400 in two separate portions may allow the binder material 500 to more fully penetrate the layer of build material 400 between deposition steps, improving the binding action of the binder material 500 with respect to the build material 400. Additionally or alternatively, depositing the binder material 500 on the layer of build material 400 in two separate portions may prevent displacement of the build material 400 in the overlapping portions as less binder material 500 may be deposited per print operation while still achieving deposition of the same amount of binder material 500 on the build material 400 at the end of the print cycle. While deposition of the binder material 500 on the layer of build material 400 has been described herein as occurring in two separate portions, it should be understood that, in other embodiments, the deposition of the binder material 500 on the layer of build material 400 may occur in more than two separate portions, such as when the print head 150 is scanned over the build platform 120 multiple times. For example, in some embodiments the same pattern of binder material 500 may be jetted onto the build material 400 multiple times under a controlled rate to facilitate a gradual build-up of binder material 500 to account for powder wetting speeds. This may also be used to more uniformly control the time between deposition and subsequent curing along different areas of the build platform.

While the binder material 500 has been described as being deposited in two portions which at least partially overlap, it should be understood that other embodiments are contemplated and possible. For example, the binder material 500 may be deposited by the print head 150 in a single pass, such as when the binder material 500 is deposited on the layer of build material 400 as the print head 150 traverses the working axis 116 (FIG. 1) of the apparatus 100 in the direction indicated by arrow 306 of FIG. 4B or the direction indicated by arrow 307 of FIG. 4C.

Figure 4D:
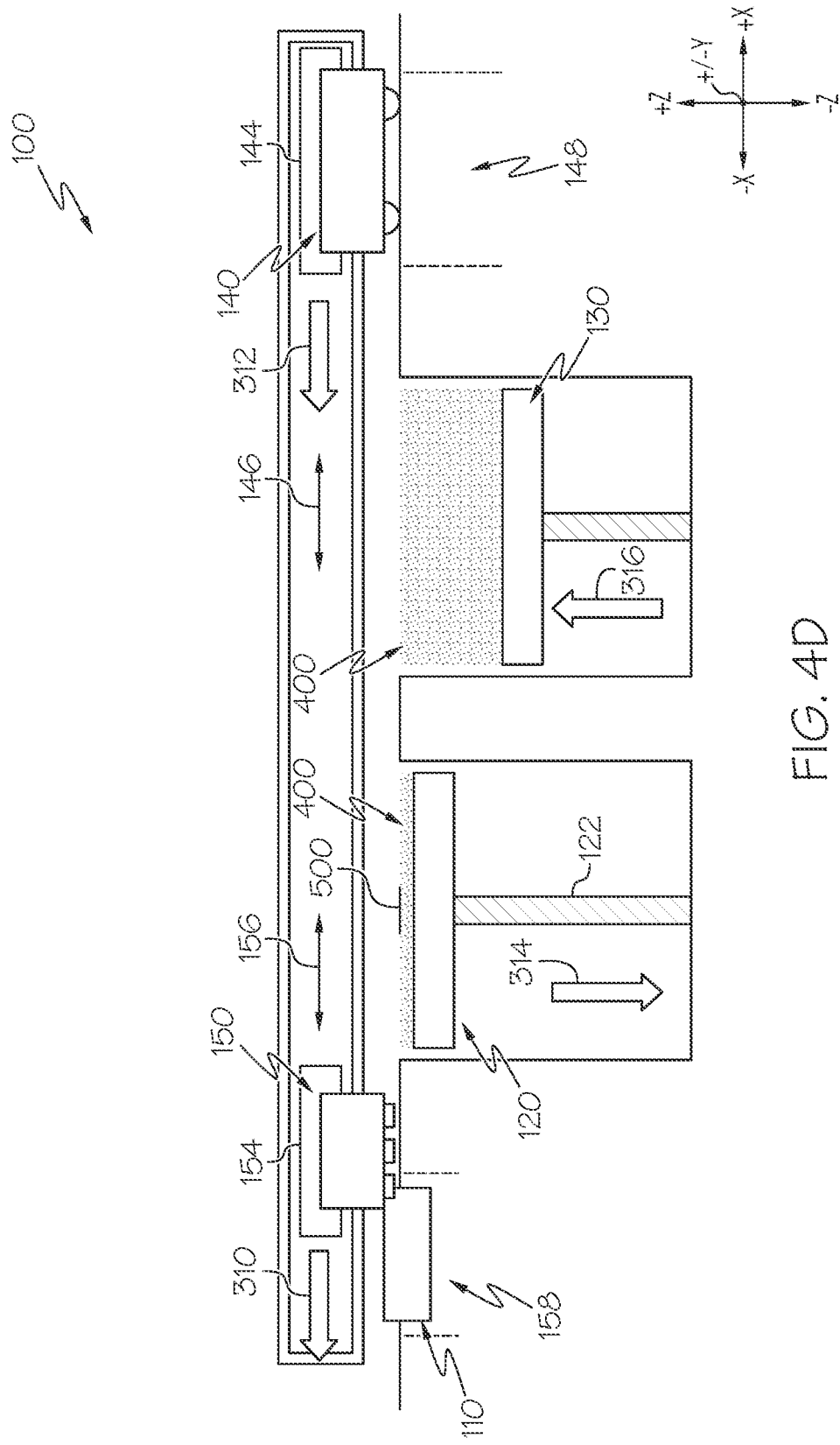
FIG. 4D schematically depicts an additive manufacturing apparatus comprising the actuator assembly of FIG. 2A in use according to one or more embodiments shown and described herein.

Referring now to FIG. 4D, after the layer of binder material 500 is deposited on the layer of build material 400 positioned on the build platform 120, the control system 200 sends a control signal to the print head actuator 154 causing the print head actuator 154 to return the print head 150 to the print home position 158 along the working axis 116 (FIG. 1) in a second print direction opposite the first print direction, as indicated by arrow 310, at a print head return rate. This is accomplished by actuating the print head actuator 154 along the print motion axis 156 in the −X direction of the coordinate axes depicted in the figures. In embodiments, the print head return rate is greater than the deposition return rate. In embodiments, the print head return rate may be greater than the print head advance rate.

Still referring to FIG. 4D, as the print head 150 traverses away from the build platform 120, the control system 200 sends a control signal to the build platform actuator 122 that actuates the build platform actuator 122 in the downward vertical direction (i.e., in the −Z direction of the coordinate axes depicted in FIG. 1), as indicated by arrow 314, thereby moving the build platform 120 in the downward vertical direction away from the working axis 116 of the apparatus 100. The build platform 120 is moved in the downward vertical direction by an amount sufficient to accommodate receiving a new layer of build material 400 from the supply platform 130.

Still referring to FIG. 4D, the print home position 158 is generally co-located with the cleaning station 110, as described herein. Accordingly, as the print head 150 returns to the print home position 158, cleaning and maintenance operations on the print head 150 are initiated.

As depicted in FIG. 4D, as the print head 150 is traversing towards the print home position 158, the control system 200 initiates the next build cycle. Specifically, the control system 200 initiates the next build cycle by sending a control signal to the supply platform actuator 132 that actuates the supply platform actuator 132 in the upward vertical direction and by sending a control signal to the recoat head actuator 144 causing the recoat head actuator 144 to advance the recoat head 140 from the recoat home position 148 towards the print home position 158 along the working axis 116, as described hereinabove with respect to FIGS. 1 and 4A.

While FIGS. 1 and 4A-4D depict an additive manufacturing apparatus 100 comprising a supply receptacle 134 used in conjunction with the recoat head 140 of the actuator assembly 102 to supply build material 400 to the build platform 120 of the build receptacle 124, it should be understood that other embodiments are contemplated and possible. For example, in embodiments, the apparatus 101 may include a build material hopper instead of a supply receptacle. In such embodiments, the build material hopper may be coupled to the recoat head actuator 144 or fixed over the build platform 120. Moreover, while FIGS. 1 and 4A-4D depict an additive manufacturing apparatus 100 comprising actuator assemblies as depicted in FIGS. 2A-2C, it should be understood that other configurations of actuator assemblies are contemplated and possible.

Figure 5A:
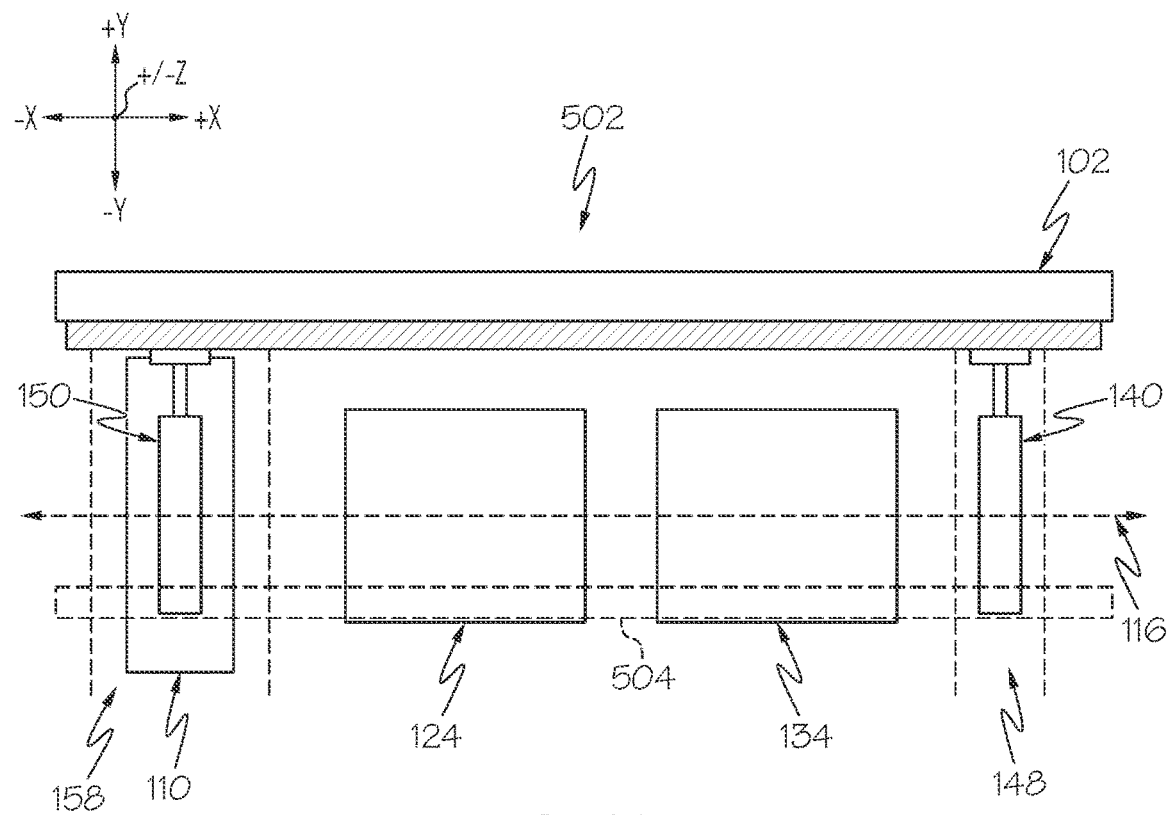
FIG. 5A schematically depicts a top-down view of an additive manufacturing apparatus comprising the actuator assembly of FIGS. 2A-2C according to one or more embodiments shown and described herein.
Figure 5B:
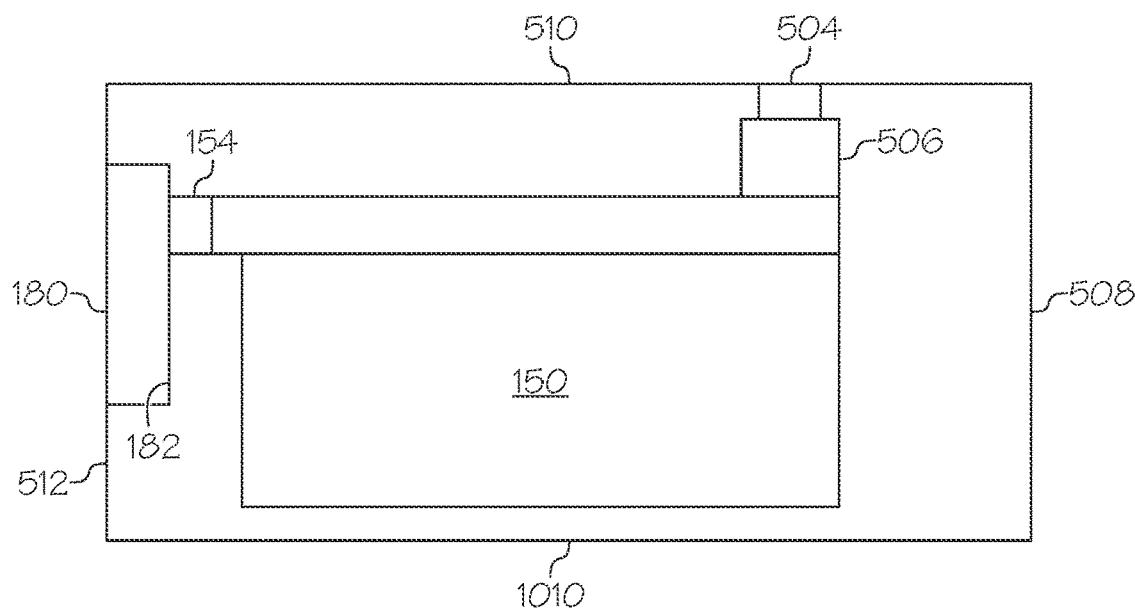
FIG. 5B schematically depicts a cross section of an additive manufacturing apparatus including a print head support rail according to one or more embodiments shown and described herein.

Referring now to FIG. 5A, a top-down view of the additive manufacturing apparatus 100 of FIG. 1 and comprising the actuator assembly 102 of FIGS. 2A-2C is schematically depicted. As shown in FIG. 5A, the additive manufacturing apparatus 100 comprises a cleaning station 110, a build receptacle 124, a supply receptacle 134 and the actuator assembly 102. The actuator assembly 102 comprises, among other elements, a recoat head 140 for distributing build material and a print head 150 for depositing binder material. The cleaning station 110, the build receptacle 124, and the supply receptacle 134 are arranged along the working axis 116 of the apparatus 100 with the build receptacle 124 positioned between the cleaning station 110 and the supply receptacle 134. The actuator assembly 102 is laterally spaced apart from the build receptacle 124 that reduces fouling of the electrical components of the actuator assembly 102, as described hereinabove. Further, the actuator assembly 102 is constructed to facilitate independent control of the recoat head 140 and the print head 150 along the working axis 116 of the apparatus 100. For example, the actuator assembly 102 facilitates traversing the print head 150 along the working axis 116 from a print home position 158 co-located with the cleaning station 110, over the build receptacle 124 and back again. The actuator assembly 102 also facilitates traversing the recoat head 140 along the working axis 116 from a recoat home position 148, over the supply receptacle 134, over the build receptacle 124 and back again. Independent actuation and control of the recoat head 140 and the print head 150, in turn, allows for at least some steps of the additive manufacturing process to be performed simultaneously thereby reducing the overall cycle time of the additive manufacturing process to less than the sum of the cycle time for each individual step.

In embodiments, an optional support rail 504 may be included, as shown in FIGS. 5A-5B and 7. The support rail 504 extends horizontally in a direction parallel to the rail of the actuator assembly 102. When included, the support rail 504 is mounted to a part of the additive manufacturing apparatus 100, such as the top panel 510 of the process chamber, as described in greater detail above. Together, the top panel 510, the rear panel 512, the front panel 508, and the working surface 1010 define the process chamber which encloses the print head 150 and the recoat head 140, along with the actuator assembly described hereinabove. In embodiments, in addition to providing a sealable environment around the print head 150 and recoat head 140, the process chamber may further provide a surface to which the support rail 504 can be mounted. The print head 150 and/or the recoat head 140 are coupled to and slidable along the support rail 504, such as through a support bracket 506 or support arm, and are supported in their cantilevered position through the support rail 504. In some embodiments, two support rails may be included to enable each of the print head 150 and the recoat head 140 to be coupled to a different rail. In such embodiments, one of the support rails may be coupled to a working surface 1010. Although depicted in FIGS. 5A and 5B, it should be understood that some embodiments do not include the optional support rail 504.

While FIGS. 1 and 4A-4D depict one embodiment of a build receptacle 124 and an additive manufacturing operation using the build receptacle 124, it should be understood that other embodiments of build receptacles are contemplated and possible. For example, the time for building an object by the additive manufacturing processes described herein may be further reduced by curing layers of binder material while subsequent layers of binder material are deposited on the build material. Accordingly, in some embodiments, the additive manufacturing apparatus 100 depicted in FIG. 1 may comprise a build receptacle 124 which facilitates curing layers of deposited binder material 500 while subsequent layers of binder material are deposited on build material 400 distributed on the build platform 120 of the build receptacle 124.

The foregoing description includes various embodiments of components of additive manufacturing apparatuses and methods for using the same. It should be understood that various combinations of these components may be included in additive manufacturing apparatuses and arranged in (or coupled to) a support chassis. In various embodiments, the support chassis is at least partially covered with a skin. The arrangement of the various components of the additive manufacturing apparatus within the support chassis and skin enable the components to be more readily accessed by a user for servicing the additive manufacturing apparatus as compared to conventional additive manufacturing apparatuses, which in turn can reduce machine downtime, thereby increasing throughput capacity.

Figure 6:
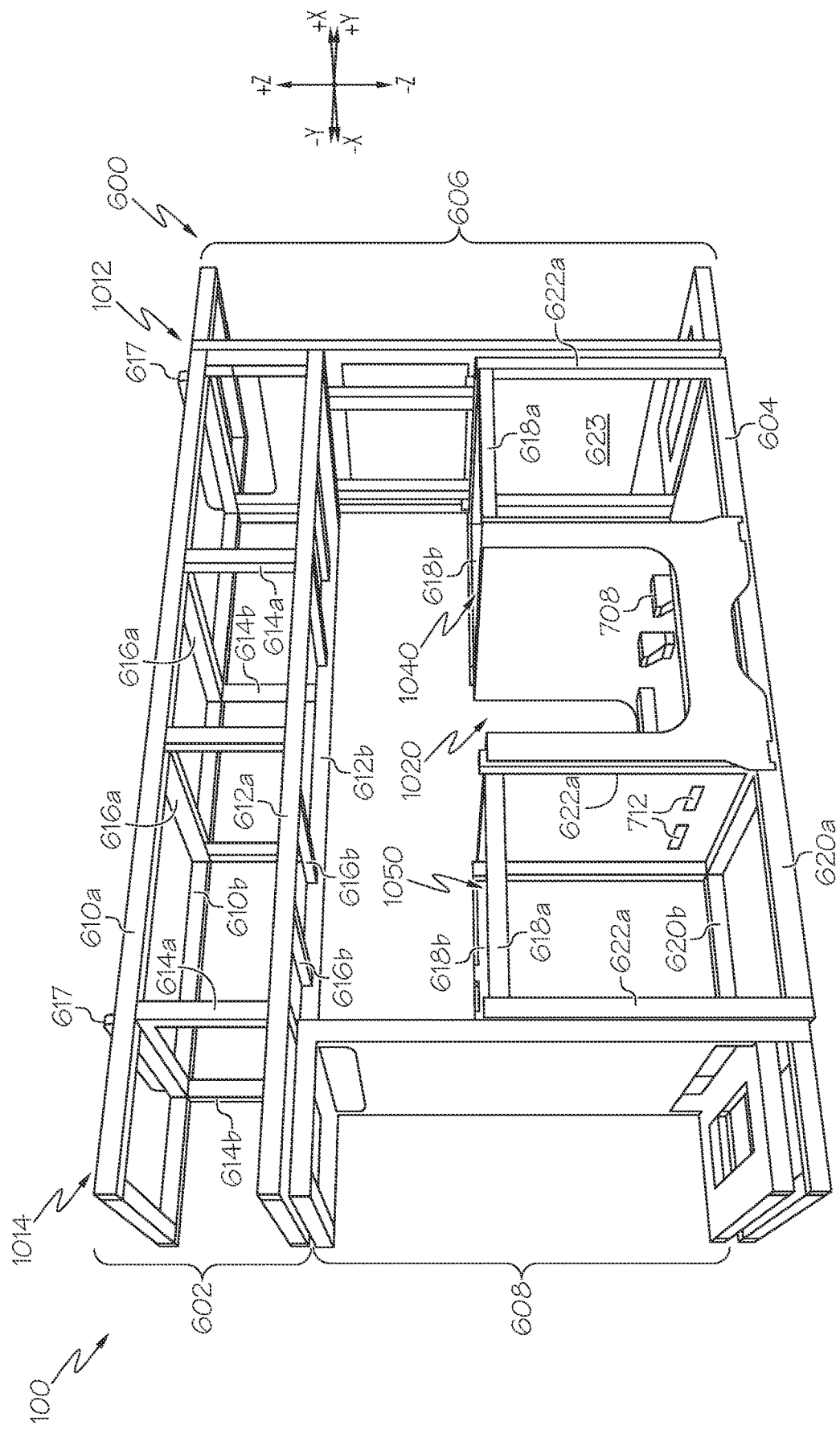
FIG. 6 schematically depicts a support chassis of an additive manufacturing apparatus according to one or more embodiments shown and described herein.

Referring to FIGS. 6 and 7 by way of example, the additive manufacturing apparatus 100 comprising a support chassis 600 is schematically depicted. While specific reference is made herein to the support chassis as being a component of the additive manufacturing apparatus 100, it should be understood that the support chassis 600 may be used in conjunction with any embodiment of an additive manufacturing apparatus described herein. The support chassis 600 generally comprises an upper environmental chassis section 602, a lower chassis section 604, a high voltage chassis section 606, and a low voltage chassis section 608.

The upper environmental chassis section 602 includes a pair of upper horizontal support members 610a, 610b, a pair of lower horizontal support members 612a, 612b, a plurality of pairs of vertical support members 614a, 614b, and a plurality of lateral support members 616a, 616b. Upper horizontal support member 610a is spaced apart from upper horizontal support member 610b in the lateral direction in a horizontal plane (i.e., the upper horizontal support member 610*a* is spaced apart from the upper horizontal support member 610*b* in the +/−Y direction in a plane parallel to the Y-Z plane of the coordinate axes depicted in the figures). Similarly, the lower horizontal support member 612*a* is spaced apart from the lower horizontal support member 612*b* in the lateral direction in a horizontal plane (i.e., the lower horizontal support member 612*a* is spaced apart from lower horizontal support member 612*b* in the +/−Y direction in a plane parallel to the Y-Z plane of the coordinate axes depicted in the figures). The pair of upper horizontal support members 610*a*, 610*b* are spaced apart from the pair of lower horizontal support members 612*a*, 612*b* in the vertical direction (i.e., the +/−Z direction of the coordinate axes depicted in the figures). Pairs of vertical support members 614*a*, 614*b* extend between and are coupled to the pair of upper horizontal support members 610*a*, 610*b* and the pair of lower horizontal support members 612*a*, 612*b*, as depicted in FIG. 6. Additionally, pairs of lateral support members 616*a* extend between and are coupled to the pair of upper horizontal support members 610*a*, 610*b*, while pairs of lateral support members 616*b* extend between and are coupled to the pair of lower horizontal support members 612*a*, 612*b*.

The lower chassis section 604 includes a plurality of pairs of working surface support members 618*a*, 618*b*, a pair of lower horizontal support members 620*a*, 620*b*, and a plurality of pairs of vertical support members 622*a*, 622*b*. Working surface support member 618*a* is spaced apart from working surface support member 618*b* in the lateral direction in a horizontal plane (i.e., the working surface support member 618*a* is spaced apart from the working surface support member 618*b* in the +/−Y direction in a plane parallel to the Y-Z plane of the coordinate axes depicted in the figures). Similarly, the lower horizontal support member 620*a* is spaced apart from the lower horizontal support member 620*b* in the lateral direction in a horizontal plane (i.e., the lower horizontal support member 620*a* is spaced apart from lower horizontal support member 620*b* in the +/−Y direction in a plane parallel to the Y-Z plane of the coordinate axes depicted in the figures). The pair of working surface support members 618*a*, 618*b* are spaced apart from the pair of lower horizontal support members 620*a*, 620*b* in the vertical direction (i.e., the +/−Z direction of the coordinate axes depicted in the figures). Pairs of vertical support members 622*a*, 622*b* extend between and are coupled to the pair of working surface support members 618*a*, 618*b* and the pair of lower horizontal support members 620*a*, 620*b*, as depicted in FIG. 6. In embodiments, lateral panels 623 extend between and are coupled to at least a pair of the vertical support members 622*a*, 622*b*. Other types of lateral support for the lower chassis section 604 are contemplated and possible, including one or more lateral supports extending between and coupled to the vertical support members 622*a*, 622*b*, the working surface support members 618*a*, 618*b*, and/or the lower horizontal support members 620*a*, 620*b*, or a combination of lateral supports and lateral panels.

The pairs of vertical support members 622*a*, 622*b* segment the volume enclosed by the lower chassis section 604 into a plurality of bays, specifically a build bay 1020, a material supply bay 1040 (also referred to as recoatbay 1040), and a print bay 1050. In the embodiments described herein, the build bay 1020 is positioned between the material supply bay 1040 and the print bay 1050 along the working axis 116 (FIG. 1) of the additive manufacturing apparatus 100. Each of the build bay 1020, the material supply bay 1040, and the print bay 1050 will be described in further detail herein.

Referring to FIG. 7, the support chassis 600 further comprises a working surface 1010 supported by the working surface support members 618*a*, 618*b* of the lower chassis section 604 within the volume defined by the support chassis 600. In particular, the working surface 1010 is within the volume defined between the upper environmental chassis section 602 and the lower chassis section 604. The working surface 1010 is generally horizontal (i.e., parallel to the X-Y plane of the coordinate axes depicted in the figures) and extends through each of the build bay 1020, the material supply bay 1040, and the print bay 1050 between the lower horizontal support members 612*a*, 612*b* of the upper environmental chassis section 602 and the working surface support members 618*a*, 618*b* of the lower chassis section 604. The working surface 1010 segments each of the build bay 1020, the material supply bay 1040, and the print bay 1050 into upper compartments 1022, 1042, 1052 and lower compartments 1024, 1044, 1054. In the embodiments described herein, the actuator assembly (not depicted in FIGS. 6 and 7) is positioned over the working surface 1010 and extends from the upper compartment 1052 of the print bay 1050, through the upper compartment 1022 of the build bay 1020, and into the upper compartment 1042 of the material supply bay 1040 such that the print head and recoat head associated with the actuator assembly are able to traverse over portions of the working surface 1010 of the additive manufacturing apparatus 100 along the working axis 116 (FIG. 1).

In embodiments, the working surface 1010 is coupled to the front panel 508 and the rear panel 512 of the process chamber, as described above with respect to FIG. 5B. Accordingly, the working surface support members 618*a*, 618*b* supports the process chamber through the working surface 1010.

Still referring to FIGS. 6 and 7, in embodiments, the support chassis 600 of the additive manufacturing apparatus 100 may further comprise a high voltage chassis section 606 and a low voltage chassis section 608. In embodiments, the high voltage chassis section 606 is positioned on a first end 1012 of the support chassis 600 and the low voltage chassis section 608 is positioned on a second end 1014 of the support chassis 600 opposite the first end 1012. The high voltage chassis section 606 houses power supplies and associated electronics operating at voltages of 120 volts or greater, such as power supplies and associated electronics powering the motors, heaters, fans, etc. of the additive manufacturing apparatus 100. The low voltage chassis section 608 houses power supplies and associated electronics operating at voltages of less than 120 volts, such as power supplies and associated electronics powering the control system, pumps, sensors, etc. of the additive manufacturing apparatus 100. Separating the high voltage chassis section 606 from the low voltage chassis section 608 avoids electromagnetic interference with (and potential damage to) sensitive electronic components (such as control units, sensors, pumps, etc.) that operate at lower voltages due to the magnetic fields generated by power supplies and associated electronics operating with high voltage.

In various embodiments, the lower chassis section 604 is secured to the low voltage chassis section 608 at a first end of the lower chassis section 604, and the upper environmental chassis section 602 is secured to and extends over the low voltage chassis section 608 and the lower chassis section 604. The high voltage chassis section 606 is secured to the upper environmental chassis section 602 and the lower chassis section 604 at a second end of the lower chassis section 604.

Referring again to FIG. 7, in the embodiments described herein, the print bay 1050 comprises a cleaning station 110 positioned in the working surface 1010 within the print bay 1050. In particular, the cleaning station 110 may be mounted to the working surface 1010 and extend through an aperture formed in the working surface 1010. The cleaning station 110 may be used, for example, to clean the print head (not depicted) of the additive manufacturing apparatus 100, as described herein. In embodiments, the lower compartment 1054 of the print bay 1050 may comprise a cleaning solution supply tank 1056 fluidly coupled to the cleaning station 110 to supply fresh cleaning fluid to the cleaning station 110. The cleaning solution supply tank 1056 may be fluidly coupled to the cleaning station 110 with supply line (not shown). In embodiments, the lower compartment 1054 of the print bay 1050 may further comprise a cleaning solution recovery tank (not shown) fluidly coupled to the cleaning station 110 to collect used cleaning fluid from the cleaning station 110. The cleaning solution recovery tank may be fluidly coupled to the cleaning station 110 with a supply line. In embodiments, the lower compartment 1054 of the print bay 1050 may further comprise a binder supply tank 1061 fluidly coupled to the print head (not shown). The binder supply tank 1061 may be fluidly coupled to the print head with a supply line (not shown).

In various embodiments, the lower compartment 1054 of the print bay 1050 further includes at least one system panel 1057 mounted to the lower chassis section 604 via hinges. In embodiments, the system panel 1057 has one or more system components mounted on a first side (shown in FIG. 9C) and on a second side (shown in FIG. 7) for operation of the additive manufacturing apparatus 100. For example, in some embodiments, the system panel 1057 can have components of a pneumatic system of the additive manufacturing apparatus 100 mounted thereon, such as pneumatic solenoids or actuators to enable operation of one or more components of the additive manufacturing apparatus. The system panel 1057 is rotatable between a first position in which the system panel is parallel to a lower access door (such as lower access door 1062b, described in greater detail below) that provides access to the lower chassis section 604 such that when the lower access door is closed, the first side of the system panel 1057 is positioned between the lower access door and the second side of the system panel 1057 and a second position in which the second side of the system panel is exposed through the skin at least partially covering the support chassis 600. For example, the system panel 1057 may be hinged to rotate in a manner similar to the lower access door 1062b to enable access to the system components on both sides of the system panel 1057.

In embodiments, the lower compartment 1024 of the build bay 1020 comprises a build receptacle carriage 624 for receiving a build receptacle 124. The build receptacle carriage 624 is adjustably coupled to the lower chassis section 604. In these embodiments, the working surface 1010 of the support chassis 600 comprises an opening 625 for receiving the build receptacle 124 such that the build receptacle 124 is removably positioned in the working surface 1010 and the build receptacle carriage 624 within the lower compartment 1024 of the build bay 1020. This allows for the build receptacle 124 (and the contents thereof) to be removed from the additive manufacturing apparatus 100 after a build operation is completed and an empty build receptacle 124 to be installed in the working surface 1010 and lower compartment 1024 of the build bay 1020. The lower compartment of the build bay 1020 may further comprise a lift system 800 (not shown in FIG. 7) for raising and lowering the build platform 120 of the build receptacle 124, as described herein.

In embodiments, the lower compartment 1024 of the build bay 1020 further comprises a conveyor system 626 that extends through the lower compartment 1024 in a lateral direction (e.g., in the +/−Y direction in FIG. 7). When included, the conveyor system 626 can enable a build receptacle 124 to be received from another conveyor system and automatically installed within the additive manufacturing apparatus 100 and to be removed from the additive manufacturing apparatus 100 and transferred to another conveyor system. Accordingly, the conveyor system 626 can enable the build receptacle 124 to pass through the additive manufacturing apparatus 100 in an automated fashion without requiring human intervention.

Figure 8A:
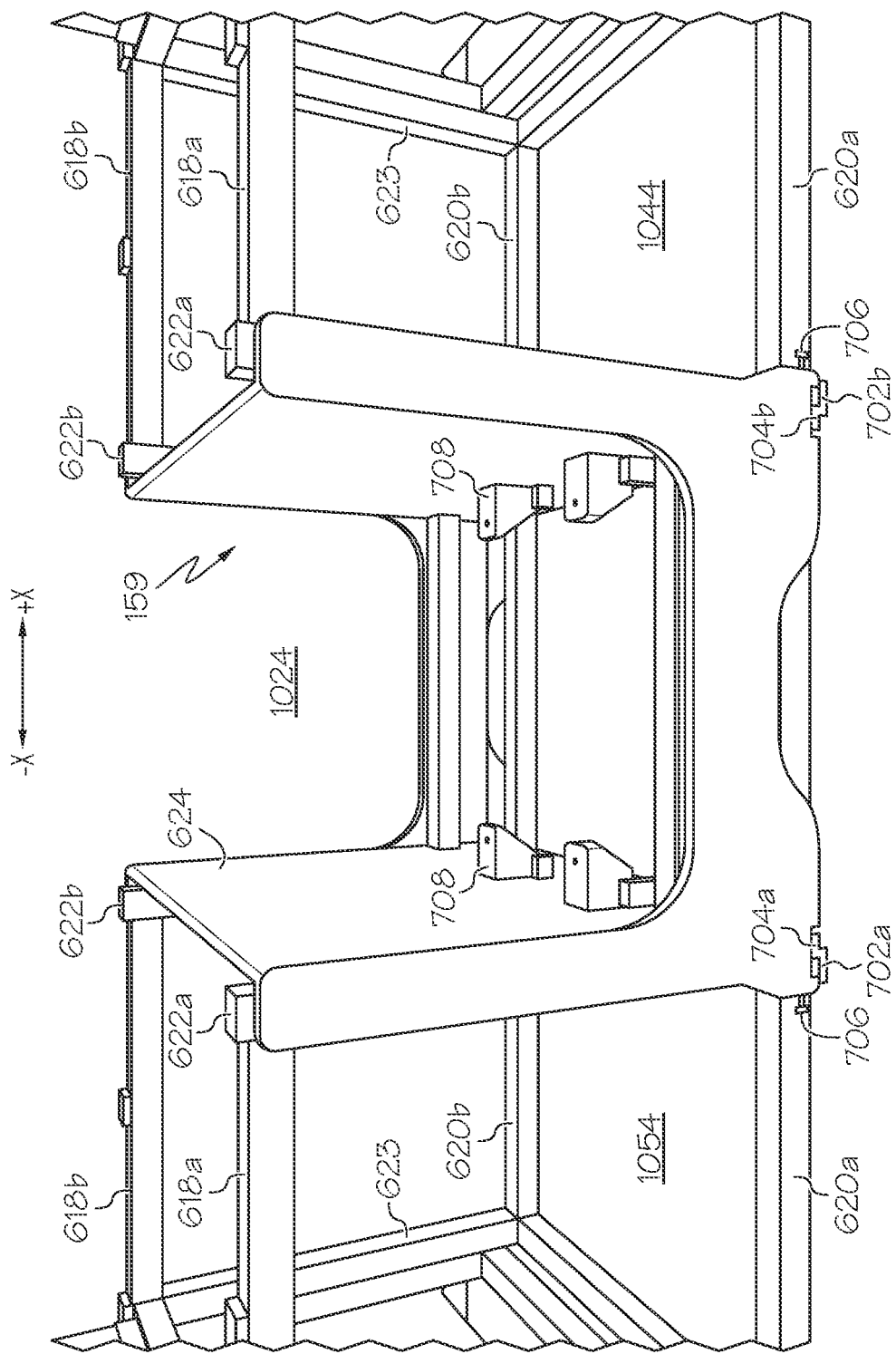
FIG. 8A schematically depicts a build receptacle carriage within the support chassis of FIG. 6 according to one or more embodiments shown and described herein.

Referring now to FIG. 8A, the build receptacle carriage 624 is shown in greater detail. As shown in FIG. 8A, the lower horizontal support member 620a of the lower chassis section 604 includes a pair of horizontal carriage supports 702a, 702b, proximate the lower compartment 1024 of the build bay 1020. Each of the horizontal carriage supports 702a, 702b includes a corresponding hard stop 704a, 704b. Although only the lower horizontal support member 620a is shown in FIG. 7 as including horizontal carriage supports 702a, 702b, it is contemplated that the lower horizontal support member 620b may also include a pair of horizontal carriage supports. Each of the horizontal carriage supports 702a, 702b extends in a lateral direction from the lower horizontal support member 620a and in a direction parallel to the working axis 116 to provide a support surface on which the build receptacle carriage 624 is disposed. In embodiments, the pair of horizontal carriage supports 702a, 702b are positioned vertically below (e.g., in the −Z direction in the FIGS.) a pair of vertical support members 622a such that the build receptacle carriage 624 is positioned between the pair of vertical support members 622a defining the lower compartment 1024 of the build bay 1020.

In various embodiments, the build receptacle carriage 624 includes at least one adjustment pin 706. The adjustment pin 706 may be, for example, a set screw or other pin that extends through an aperture on the build receptacle carriage 624. When the build receptacle carriage 624 is positioned within the lower compartment 1024 of the build bay 1020 and on the pair of horizontal carriage supports 702a, 702b, movement of the adjustment pin 706 causes the adjustment pin 706 to push against the lower chassis section 604, and specifically, against one of the pair of vertical support members 622a to adjust a position of the build receptacle carriage 624 within between the first end and the second end of the lower chassis section 604 along the horizontal carriage supports 702a, 702b. In other words, movement of the adjustment pin 706 can cause the build receptacle carriage 624 to move in the +/−X direction of the axis shown in the FIGS. between adjacent vertical support members 622a. The corresponding hard stop 704a, 704b on the pair of horizontal carriage supports 702a, 702b extend vertically (e.g., in the +/−Z direction) from the support surface on which the build receptacle carriage 624 is disposed to limit the range of motion of the build receptacle carriage 624 in the +/−X direction.

The build receptacle carriage 624 is adjustably coupled to a plurality of lift system mount brackets 708. In the illustrated example, there are four lift system mount brackets 708; however, there may be more or less than four lift system mount brackets 708. The lift system mount brackets 708 are provided to fixedly mount a support platform 137 of a lift system 800 (FIG. 1) within the build receptacle carriage 624.

Figure 8B:
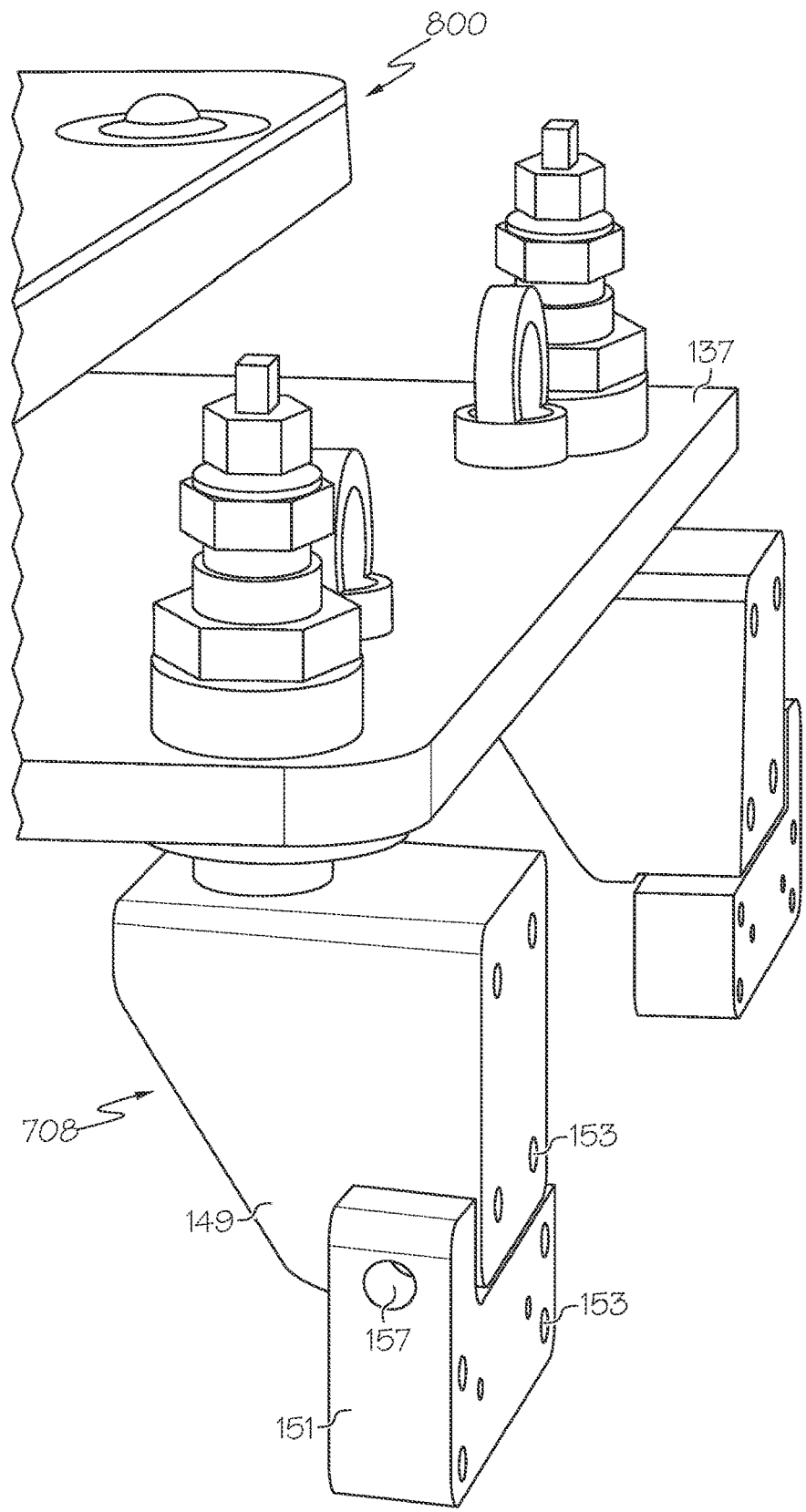
FIG. 8B illustrates a build platform mount bracket for mounting a lift platform assembly to the build receptacle carriage of FIG. 8A, according to one or more embodiments shown and described herein.

FIG. 8B illustrates the lift system mount bracket 708 in greater detail mounted to the support platform 137 of the lift system 800. The lift system mount bracket 708 includes an angled mounting block 149 that is mounted on an L-shaped bracket 151. The L-shaped brackets 151 are each mounted to the sidewalls 159 of the build receptacle carriage 624, such as through elongated slots 712 (FIG. 6) in the sidewalls 159. Both of the mounting block 149 and the bracket 151 include fastener openings 153 that can be used to fixedly mount the brackets 151 and mounting block 149 to the sidewall 159 of the build receptacle carriage 624. Until the mounting block 149 is mounted to the sidewall 159 of the build receptacle carriage 624, the mounting block 149 may be slidably supported on the bracket 151. An adjustment screw (not shown) may be located in an opening 157. The adjustment screw may allow for fine front-to-rear adjustment of the mounting block 149 and lift system 800 within the build receptacle carriage 624. When the lift system 800 is in the desired position, the mounting block 149 may be mounted to the sidewall 159.

In some embodiments, the lower compartment 1044 of the material supply bay 1040 comprises a supply receptacle 134. In these embodiments, the working surface 1010 of the support chassis 600 comprises an opening for receiving the supply receptacle 134 such that the supply receptacle 134 is removably positioned in the working surface 1010. In embodiments, a dosing hopper 702 may be in communication with the supply receptacle 134 and may provide build material 400 to the supply receptacle 134. The lower compartment 1044 of the build bay 1020 may further comprise a lift system 800 for raising and lowering the supply platform 130 of the supply receptacle 134, as described herein. By raising and lowering the supply platform 130, the lift system 800 may deliver build material 400 from the supply receptacle 134 to the working surface 1010. In some embodiments, the dosing hopper 702 may continuously or periodically provide build material 400 to the supply receptacle 134 as build material 400 is moved from the supply receptacle 134 to the build platform 120.

While FIGS. 1-2C, 4A-5, and 7 depict the material supply bay 1040 as comprising a supply receptacle 134 and a lift system 800 (not shown in some of the FIGS.), it should be understood that the supply receptacle 134 and the lift system 800 are optional and may be omitted in some embodiments, such as embodiments where the additive manufacturing apparatus 100 comprises a hopper for distributing the build material rather than supply receptacle.

In embodiments, the lower compartment 1044 of the material supply bay 1040 may further comprise one or more filters, particle separators, or other components of an environmental control system of the additive manufacturing apparatus 100. For example, in embodiments, a cyclonic separator and a filter (not shown) are located within the material supply bay 1040.

Figure 9A:
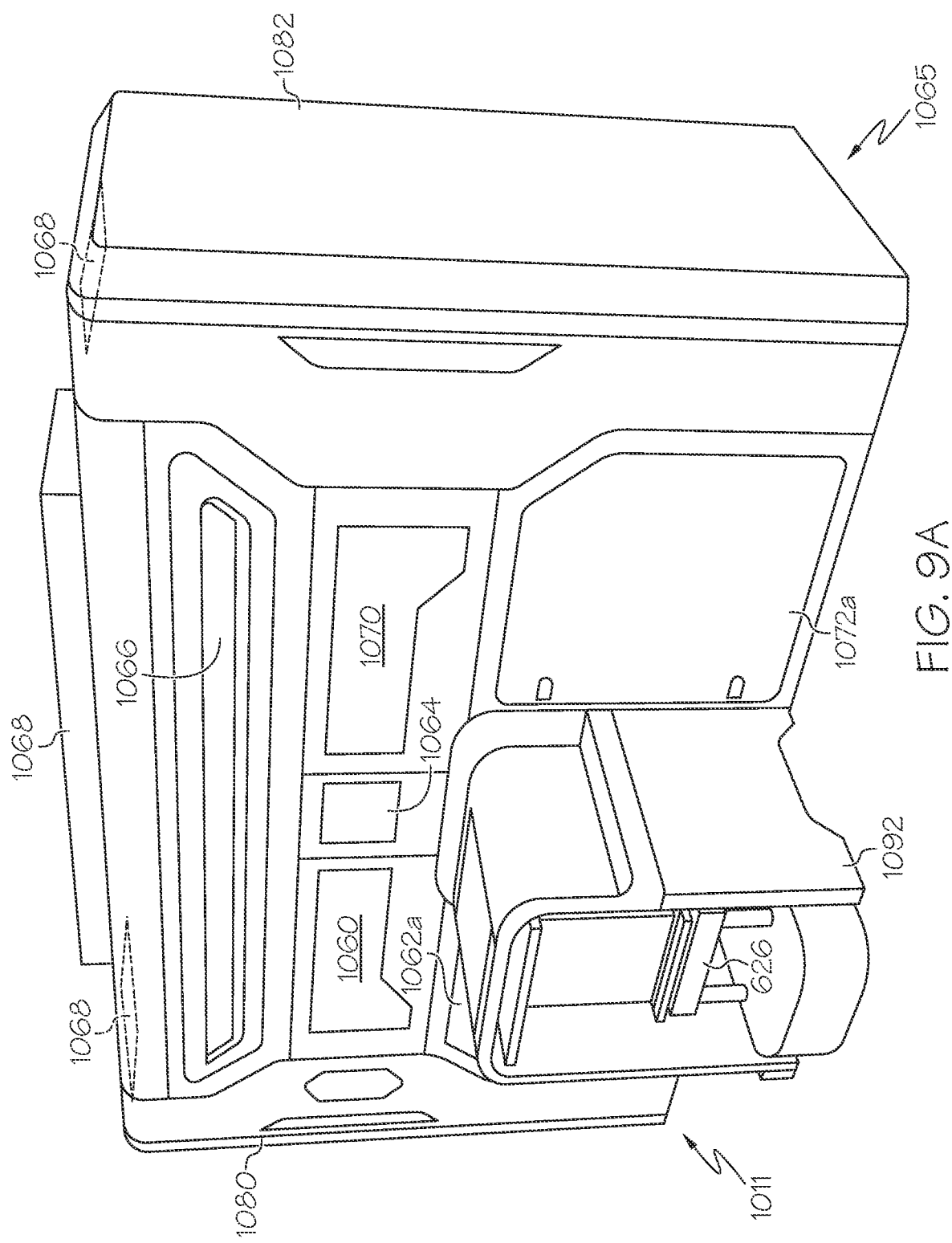
FIG. 9A schematically depicts a front perspective view of an additive manufacturing apparatus covered by a skin according to one or more embodiments shown and described herein.

Referring now to FIG. 9, the additive manufacturing apparatus 100 may further comprise at least one access panel coupled to the lower compartment 1044, 1054 of each of the material supply bay 1040, and the print bay 1050 and at least one access panel coupled to the upper compartment 1042, 1052 of each of the material supply bay 1040, and the print bay 1050. In embodiments, the front panel 508 (not shown in FIG. 9A) extends along the working axis (FIG. 1) and between the working surface support members 618*a* of the lower chassis section 604 and the lower horizontal support member 612*a* to provide support for the access panels coupled to the upper compartments.

For example, the upper compartment 1042 of the material supply bay 1040 comprises an upper access panel 1070 hingedly coupled to the front panel 508 of the process chamber (FIG. 5B) at the front 1011 of the additive manufacturing apparatus 100. Although not shown in the FIGS., the upper access panel 1070 may comprise a latch for latching the upper access panel when in a closed position. In embodiments, seals (not depicted) may be disposed between the upper access panel 1070 and the front panel 508 to facilitate sealing the upper access panel 1070 to the front panel 508 when the upper access panel 1070 is in a closed position. Sealing the upper access panel 1070 to the front panel 508 can enable the process chamber to be pressurized without leaking through the interface between the upper access panel 1070 and the front panel 508.

Further, the lower compartment 1044 of the material supply bay 1040 comprises a lower access panel 1072*a* hingedly coupled to the vertical support member 622*a* between the lower compartment 1044 of the material supply bay 1040 and the lower compartment 1024 of the build bay 1020 at the front 1011 of the additive manufacturing apparatus 100. Although not shown in the FIGS., the lower access panel 1072*a* may comprise a latch for latching the lower access panel 1072*a* when in a closed position. In embodiments, seals (not depicted) may be disposed between the lower access panel 1072*a* and the lower chassis section 604 to facilitate sealing the lower access panel 1072*a* to the support chassis 600 when the lower access panel 1072*a* is in a closed position.

The upper compartment 1052 of the print bay 1050 comprises an upper access panel 1060 hingedly coupled to the front panel 508 of the process chamber (FIG. 5B) at the front 1011 of the additive manufacturing apparatus 100. Although not shown in the FIGS., the upper access panel 1060 may comprise a latch for latching the upper access panel when in a closed position. In embodiments, seals (not depicted) may be disposed between the upper access panel 1060 and the front panel 508 to facilitate sealing the upper access panel 1060 to the front panel 508 when the upper access panel 1060 is in a closed position. Sealing the upper access panel 1060 to the front panel 508 can enable the process chamber to be pressurized without leaking through the interface between the upper access panel 1060 and the front panel 508.

Further, the lower compartment 1054 of the print bay 1050 comprises a lower access panel 1062*a* hingedly coupled to the vertical support member 622*a* between the lower compartment 1054 of the print bay 1050 and the lower compartment 1024 of the build bay 1020 at the front 1011 of the additive manufacturing apparatus 100. Although not shown in the FIGS., the lower access panel 1062*a* may comprise a latch for latching the lower access panel 1062*a* when in a closed position. In embodiments, seals (not depicted) may be disposed between the lower access panel 1062*a* and the lower chassis section 604 to facilitate sealing the lower access panel 1062*a* to the support chassis 600 when the lower access panel 1062*a* is in a closed position.

In embodiments, the upper compartment 1022 of the build bay 1020 comprises an viewing panel 1064 fixedly coupled to the front panel 508 of the process chamber (FIG. 5) between the upper access panel 1060 of the print bay 1050 and the upper access panel 1070 of the material supply bay 1040 at the front 1011 of the additive manufacturing apparatus 100.

In various embodiments, such as shown in FIG. 9A, a tunnel 1092 encloses the conveyor system 626. The tunnel 1092 can comprise a lid that opens to enable access to the conveyor system 626. For example, the lid can be a hinged lid that enables the lid to rotate with respect to the tunnel 1092 to enable access to the conveyor system 626. Alternatively, other access ports through the tunnel 1092, such as doors or removable panels may be incorporated to enable the conveyor system 626 to be accessed and receive build receptacles for use in the additive manufacturing apparatus 100. It should be appreciated that, by virtue of its enclosure of the conveyor system 626, in embodiments, the tunnel 1092 may prevent items other than the build receptacle 124 from entering the additive manufacturing apparatus 100 via the conveyor system 626. Moreover, in embodiments, the tunnel 1092 may assist in retaining build material inside the additive manufacturing apparatus instead of releasing it into the environment.

Figure 9B:
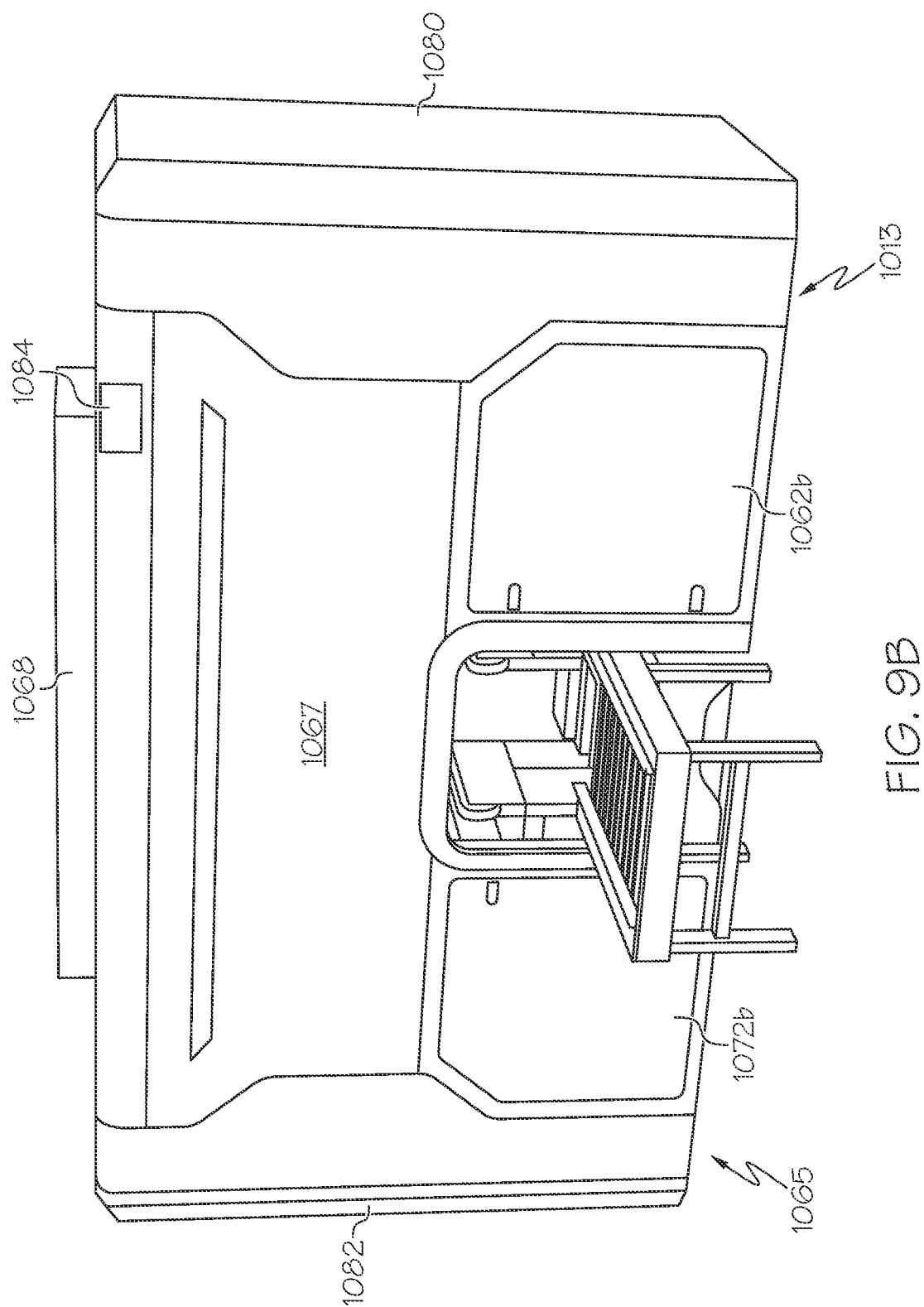
FIG. 9B schematically depicts a rear perspective view of the additive manufacturing apparatus covered by the skin of FIG. 9A according to one or more embodiments shown and described herein.

While FIG. 9A schematically depicts the upper and lower access panels disposed on the front 1011 of the additive manufacturing apparatus 100, it should be understood that the rear 1013 of the additive manufacturing apparatus 100 may include similar access panels, as shown in FIG. 9B. For example, the lower compartment 1054 of the print bay 1050 comprises a lower access panel 1062b hingedly coupled to the vertical support member 622b between the lower compartment 1054 of the print bay 1050 and the lower compartment 1024 of the build bay 1020 at the front 1011 of the additive manufacturing apparatus 100, while the lower compartment 1044 of the material supply bay 1040 comprises a lower access panel 1072b hingedly coupled to the vertical support member 622b between the lower compartment 1044 of the material supply bay 1040 and the lower compartment 1024 of the build bay 1020 at the front 1011 of the additive manufacturing apparatus 100.

In the embodiment depicted in FIG. 9A, the upper access panels 1060, 1070 and the viewing panel 1064 may be constructed of a transparent material, such as plastic or glass, to allow the build process of the additive manufacturing apparatus 100 to be visually monitored. Optionally, the lower access panels 1062a, 1062b, 1072a, 1072b may be constructed of a transparent material, such as plastic or glass.

Although the upper access panels 1060, 1070, and the viewing panel 1064 are described herein as being coupled to the front panel 508 of the process chamber and the lower access panels 1062a, 1062b, 1072a, 1072b are described herein as being coupled to the vertical support members 602a of the lower chassis section 604, it should be appreciated that the various panels can be coupled to the support chassis 600 directly or indirectly, such as through an exterior frame that is coupled to the support chassis 600. For example, in the embodiments shown in FIGS. 9A and 9B, an exterior frame supports the various panels, together with the exterior frame, form a skin 1065 around the support chassis 600. The exterior frame couples the skin 1065 to the support chassis 600 and enables one or more of the various panels to be opened or removed for access to the components of the additive manufacturing apparatus 100 enclosed within the skin 1065 and supported by the support chassis 600.

Returning to FIG. 9A, the upper environmental chassis section 602 comprises a front panel 1066 fixedly coupled to the coupled to the upper horizontal support member 610a and the lower horizontal support member 612b of the upper environmental chassis section 602 at the front 1011 of the additive manufacturing apparatus 100. A top panel 1068 extends between the upper horizontal support members 610a, 610b along the top of the upper environmental chassis section 602. In embodiments, the upper environmental chassis section 602 further comprises a pair of hoisting apertures 1069, through which a pair of machine hoisting beams 617 (FIG. 6) are accessible. As shown in FIG. 6, the pair of machine hoisting beams 617 are coupled to the upper environmental chassis section 602, and specifically, to a pair of the lateral support members 616a. The pair of machine hoisting beams 617 strengthen the pair of lateral support members 616a and enable the support chassis 600 to be lifted, such as for movement of the additive manufacturing apparatus 100.

Turning to FIG. 9B, at the rear 1013 of the additive manufacturing apparatus 100, the upper environmental chassis section 602 comprises a rear panel 1067 that extends between the upper environmental chassis section 602 and the working surface 1010. Accordingly, the rear panel 1067, in embodiments is fixedly coupled to the upper horizontal support member 610b of the upper environmental chassis section 602 and the working surface support member 618b of the lower chassis section 604. In various embodiments, the rear panel 1067 has a length that extends in a direction parallel to the working axis 116 of the additive manufacturing apparatus 100 (e.g., from the first end 1012 to the second end 1014 of the support chassis 600) that is greater than a length of the linear motion assembly (e.g., the actuator assembly 102 depicted in FIGS. 1, 2A, and 4A-5) in the direction parallel to the working axis 116 of the additive manufacturing apparatus 100. Accordingly, the rear panel 1067 enables access to the upper environmental chassis section 602 and the linear motion assembly. In embodiments, the rear panel 1067 can be removed to enable the rear panel 512 of the process chamber and the linear motion assembly, including the rail 180, the support 182, and the actuators 144, 154 to be removed from the additive manufacturing apparatus 100.

Figure 9C:
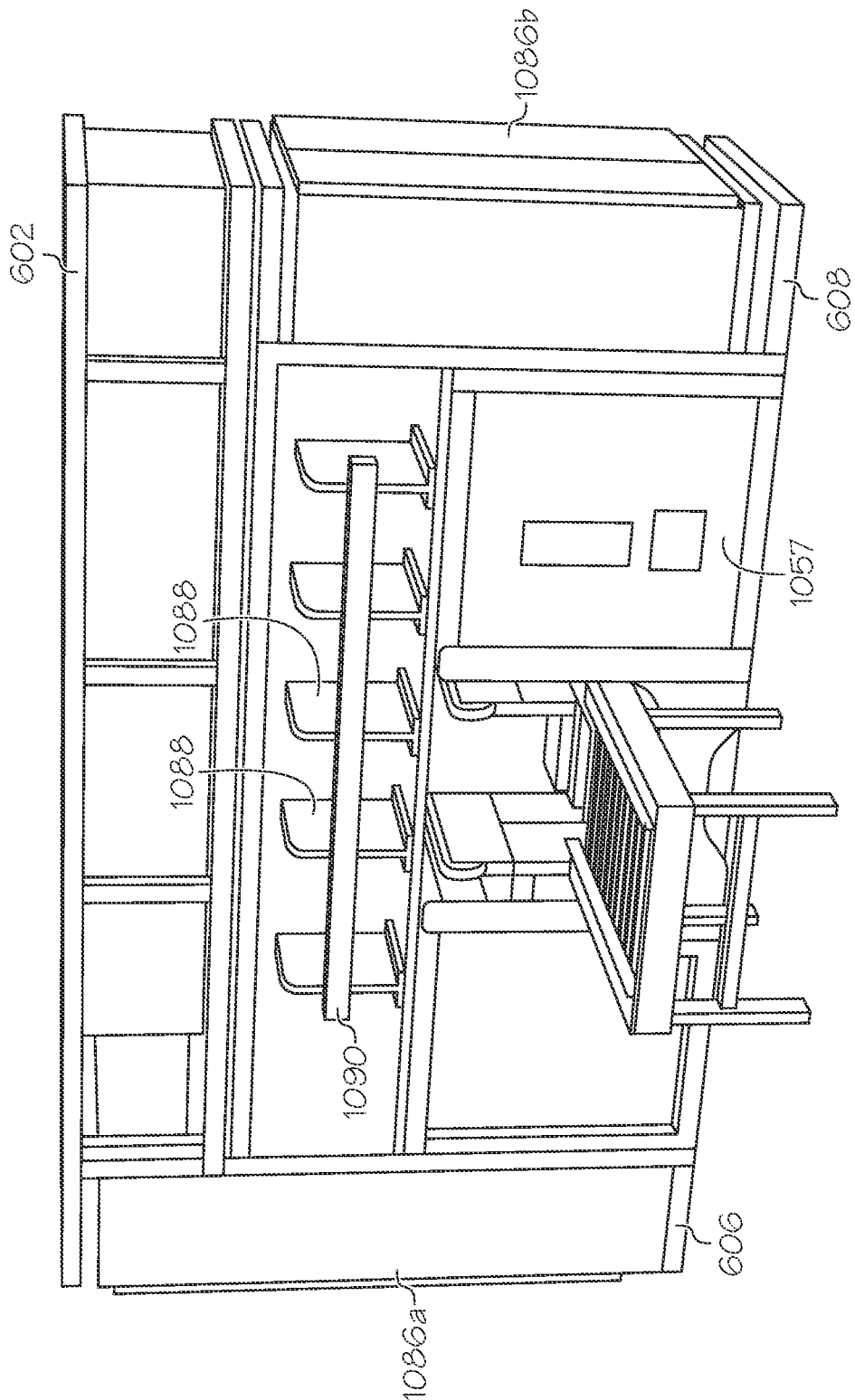
FIG. 9C schematically depicts a rear perspective view of the additive manufacturing apparatus of FIGS. 9A and 9B with the skin removed according to one or more embodiments shown and described herein.

In embodiments, to further enable the linear motion assembly to be removed from the additive manufacturing apparatus 100, the support 182 may comprise a plurality of gussets 1088, as shown in FIG. 9C. The plurality of gussets 1088 are mounted to a surface of the rear panel 512 that is adjacent to the skin 1065 and is accessible from the rear 1013 of the additive manufacturing apparatus 100. One or more of the gussets 1088 includes mount attachments (not shown), which can be in the form of, for example, one or more apertures for receiving bolts or other attachment mechanisms. For example, the gussets 1088 can include a plurality of apertures to receive bolts that extend through a mounting rail 1090 that can be coupled to a forklift for moving and lifting the additive manufacturing apparatus 100.

Returning to FIGS. 9A and 9B, the low voltage chassis section 608 comprises an access door 1080. Similarly, the high voltage chassis section 606 comprises an access door 1082. Each access door 1080 is hingedly coupled to the corresponding chassis section (e.g., directly or indirectly through the frame of the skin 1065) to enable the electrical components housed within the corresponding chassis section to be accessed. In some embodiments, the electrical components may be housed within a cabinet 1086a, 1086b (FIGS. 7 and 9C) fixedly coupled to the corresponding chassis section.

In embodiments, one or more of the front panel 1066, the rear panel 1067, the top panel 1068, and the access doors 1080, 1082 is at least partially perforated to enable ventilation through the skin 1065. For example, cooler ambient air may enter the additive manufacturing apparatus 100 through the front panel 1066 and the rear panel 1067, while warmer air from within the additive manufacturing apparatus 100 may be released to the environment through top panel and access doors 1080, 1082. It should be appreciated that although one or more components of the skin 1065 can enable air flow between the inside of the additive manufacturing apparatus 100 and the external environment, the additive manufacturing apparatus 100 of various embodiments will also include one or more environmental handling components (not shown) to control the environment within the additive manufacturing apparatus 100, and specifically within the process chamber defined by the working surface 1010, the front panel 508, the top panel 510, the end panels 514, and the rear panel 512 (shown in FIG. 5B). Some such environmental handling components may be housed within the skin 1065 and be supported by the support chassis 600, while other environmental handling components may be located outside of the skin 1065. For example, it is contemplated that, in embodiments, one or more environmental handling components may be disposed on the top panel 1068, located adjacent to the additive manufacturing apparatus 100, or even positioned in a location separate from the additive manufacturing apparatus 100, in another room of a factory in which the additive manufacturing apparatus 100 is located. Accordingly, it should be appreciated that, in embodiments, parts of the additive manufacturing apparatus 100 can be sealed and separated from the external environment (e.g., the process chamber), while other parts of the additive manufacturing apparatus 100 can remain in fluid communication with the external environment (e.g., unsealed from the external environment).

Moreover, in embodiments, environmentally controlled components can include components that are sealed and separated from the external environment, as well as components that are in fluid communication with the external environment. For example, in some embodiments, the cabinets 1086a, 1086b may include one or more fans positioned therein to cool the components within the cabinets 1086a, 1086b, but the cabinets 1086a, 1086b may not be sealed from the external environment, and air may be exchanged between the cabinets 1086a, 1086b and the external environment. As another example, in embodiments, the process chamber within which the object is built by the additive manufacturing apparatus 100 may be sealed from the external environment to enable the object to be built in an inert environment, and gas within the process chamber can be controlled using an environmental control system, such as a system that removes vapors and heat from the environmental control system. Details on one example system that is suitable is described in, for example, U.S. patent application Ser. No. 18/250,657, the entire contents of which is hereby incorporated by reference. However, other environmental control systems are contemplated and possible.

In addition to environmental handling components that are located external to the skin 1065, in embodiments, the additive manufacturing apparatus 100 can be coupled to one or more other external components. For example, a material handling system may be coupled to the additive manufacturing apparatus 100 to provide and/or receive powder, fluids (e.g., binder and cleaning fluid), and air to and/or from the additive manufacturing apparatus 100. Accordingly, in embodiments, the skin 1065 includes at least one material supply port 1084 extending through the skin 1065. The at least one material supply port 1084 is coupled to at least one external component on the outside of the skin 1065, and is coupled to one or more component of the additive manufacturing apparatus 100 that is housed within the skin 1065, such as through supply tubing, piping, or other conduit. In embodiments, a material bulkhead (not shown) is positioned within the skin 1065. For example, the material bulkhead may be a conduit or other barrier extending through the upper environmental chassis section 602 of the support chassis 600 providing a pathway through which the supply tubing, piping, or the like can be directed to provide protection to the materials and tubing. In particular, the binder supply tank 1061 and the cleaning solution supply tank 1056 may each be connected to the at least one material supply port 1084 through tubing which is guided from the lower compartment 1054 of the print bay to the upper environmental chassis section 602 through the material bulkhead. Although the at least one material port is shown in FIG. 9B as being positioned on a rear of the additive manufacturing apparatus 100 near the top panel 1068, it is contemplated that material ports may be located at other locations through the skin 1065, as may be convenient depending on the particular arrangement of the components within and external to the additive manufacturing apparatus 100.

Figure 10:
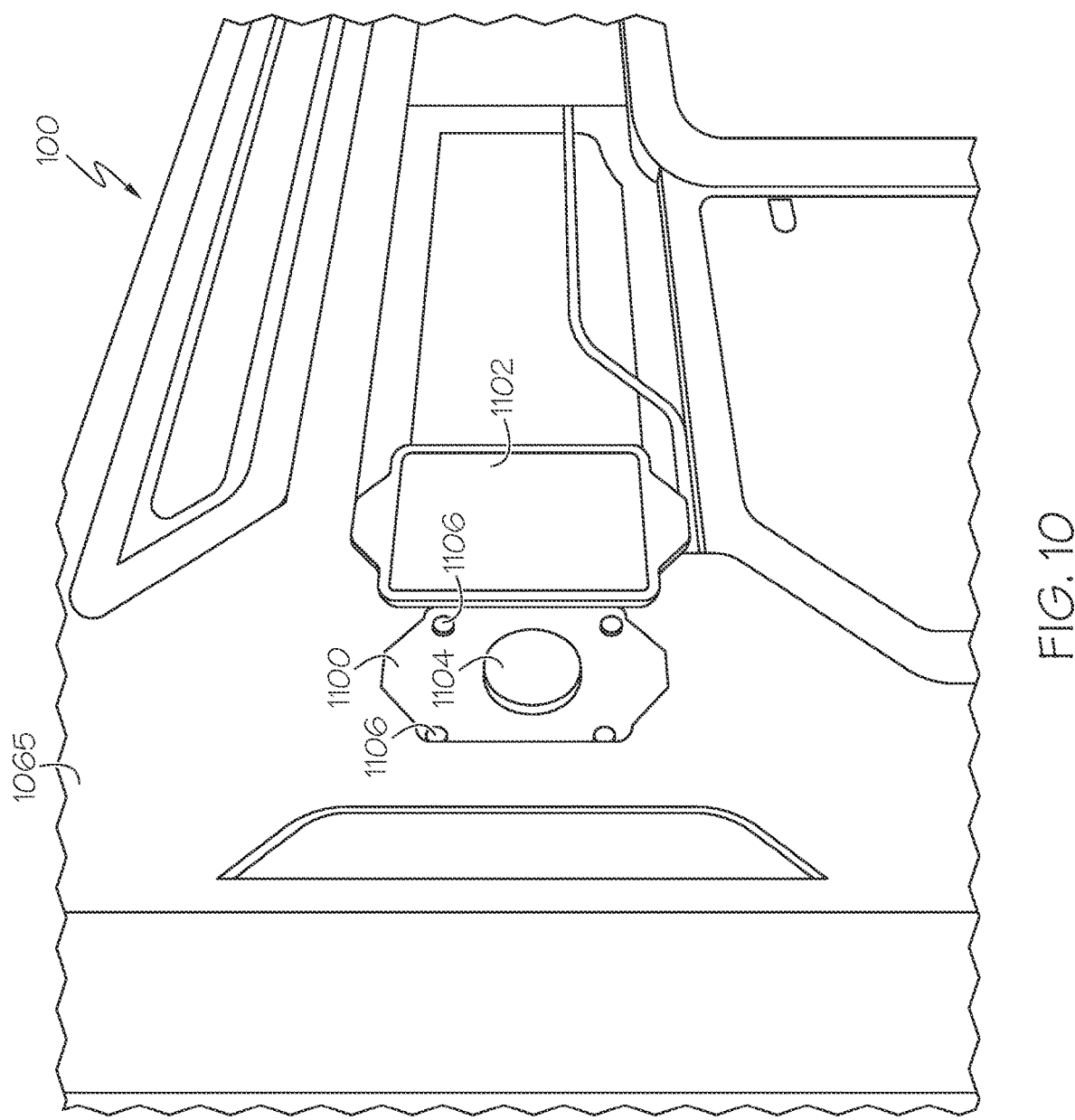
FIG. 10 schematically depicts a mobile device pocket in the skin of an additive device manufacturing apparatus according to one or more embodiments shown and described herein.

Turning now to FIG. 10, in embodiments, the skin 1065 comprises a mobile device pocket 1100. The mobile device pocket 1100 is in the form of a recess or depression in the skin 1065 that is sized to receive and hold a mobile device 1102. The mobile device 1102 may be in the form of a tablet or other portable computing device that is coupled to the control system 200 of FIG. 3. Accordingly, the mobile device 1102 provides a user interface through which an operator can interact with and control the additive manufacturing apparatus 100. In embodiments, the mobile device pocket 1100 includes a wireless charger 1104 that charges a battery of the mobile device 1102 when the mobile device 1102 is positioned within the mobile device pocket 1100. The wireless charger 1104 can be, by way of example and not limitation, a charging pad or through-surface charger. To secure the mobile device 1102 within the mobile device pocket 1100, a set of magnetic cleats 1106 can be included in the mobile device pocket 1100. For example, a magnetic cleat 1106 can be positioned at each corner of a rectangular-shaped mobile device pocket 1100 to magnetically couple the mobile device 1102 to the mobile device pocket 1100. Other securing mechanisms are contemplated and possible.

Based on the foregoing, it should be appreciated that the support chassis and skin described hereinabove enable various components of the additive manufacturing apparatus to be more readily accessible as compared to conventional additive manufacturing apparatuses, such as for servicing. Accordingly, various embodiments can include methods of servicing the additive manufacturing apparatus.

In embodiments, a first level of servicing may include opening the access door 1080 to the low voltage chassis section 608 to access the low voltage electrical cabinet 1086a mounted to the low voltage chassis section 608. The first level of servicing may also include opening the access door 1082 to the high voltage chassis section 606 to access the high voltage electrical cabinet 1086b mounted to the high voltage chassis section 606. In embodiments, the first level of servicing may also include opening the upper access panel 1060 of the print bay 1050 to access the upper compartment 1052 of the print bay 1050, the upper access panel 1070 of the material supply bay 1040 to access the upper compartment 1042 of the material supply bay, or both. The first level of servicing may also include opening at least one lower access panel coupled to the lower chassis section 604, such as one of the lower access panels 1072a, 1072b providing access to the lower compartment 1044 of the material supply bay 1040 or one of the lower access panels 1062a, 1062b providing access to the lower compartment 1054 of the print bay 1050. For example, the lower access panel 1062a can be opened to provide access to the binder supply tank 1061 and the cleaning solution supply tank 1056 and the lower access panel 1062b can be opened to provide access to a system panel 1057 that is hingedly mounted within the lower compartment 1054 of the print bay 1050. The lower access panels 1072a, 1072b can be opened to provide access to various filters or particle separation devices that are part of the environmental control system, or to provide access to a build material hopper or supply container. Accordingly, in various embodiments, the first level of servicing is enabled by various hinged doors to provide easy opening, and the first level of servicing may, therefore, be classified as normal operational access. It is contemplated that the first level of servicing can include opening any one or more of these hinged doors, as may be required to maintain and monitor normal operations of the additive manufacturing apparatus. This relatively easy access to the components that may require the most servicing enables the user to access the component in less time than in conventional additive manufacturing apparatuses. For example, various components can be accessed by the user in less than 10 minutes or less than 5 minutes, reducing machine downtime, and correspondingly, increasing machine uptime.

Quarterly or semi-annual maintenance or servicing can be regarded as the second level of servicing. The second level of servicing can include, for example, the opening of any or all of the hinged doors described with respect to the first level of servicing, in addition to removal of one or more of the rear panel 1067, the top panel 1068, and the front panel 1066. Thus, the second level of servicing can include removing panels that are removable with effort beyond the opening of a hinged door. The second level of servicing can be used, for example, to clean or exchange components of the environmental control system, the material supply system, and the various stations within the process chamber. It should be appreciated that the accessibility of the various components of the additive manufacturing apparatus 100 through the skin 1065 can enable a user to access a desired component without needing to completely disassemble the additive manufacturing apparatus, which can lead to decreased machine down time, as maintenance can be conducted in less time.

The support chassis and skin also enable a third level of servicing, which may be conducted in the case of a catastrophic failure, or otherwise, every 1-2 years. The third level of servicing can include, for example, the opening of any or all of the hinged doors described with respect to the first level of servicing, removal of one or more of the rear panel, the top panel, and the front panel described with respect to the second level of servicing, and removal of the linear motion assembly from the additive manufacturing apparatus. Accordingly, in embodiments, a method of performing the third level of servicing includes decoupling the print head 150 and the recoat head 140 from the linear motion assembly (e.g., the rail 180, the support 182, and the actuators 144, 154), removing the rear panel 1067 to expose the linear motion assembly through the skin 1065, engaging the plurality of gussets 1088 with a fork lift, and removing the linear motion assembly from the additive manufacturing apparatus 100. Decoupling the print head 150 and the recoat head 140 can include, for example, decoupling the print head 150 from the optional support rail 504 (when present) and the print head actuator 154, and decoupling the recoat head 140 from the optional support rail 504 (when present) and the recoat head actuator 144. In some embodiments, decoupling the print head 150 and the recoat head 140 from the corresponding actuator may be accomplished by removing the print head 150 or the recoat head 140 from a receptacle that couples the print head 150 or the recoat head 140 to the corresponding actuator. In some embodiments, engaging of the plurality of gussets 1088 includes coupling the mounting rail 1090 to one or more of the gussets 1088 and engaging the mounting rail 1090 with the fork lift. Accordingly, in various embodiments, the third level of servicing enables the linear motion assembly to be removed from the additive manufacturing apparatus 100 without needing to disassemble the entire additive manufacturing apparatus 100. It should be appreciated that this can lead to decreased down time since the linear motion assembly can be removed and a new linear motion assembly can be inserted while the original linear motion assembly is repaired or serviced with relative ease.

Further aspects of the invention are provided by the subject matter of the following clauses:

1. An additive manufacturing apparatus comprising: a chassis assembly comprising: a low voltage chassis section; a lower chassis section secured to the low voltage chassis section at a first end of the lower chassis section; an upper environmental chassis section secured to and extending over the low voltage chassis section and the lower chassis section; a high voltage chassis section secured to the upper environmental chassis section and the lower chassis section at a second end of the lower chassis section; a build receptacle carriage adjustably coupled to the lower chassis section; and a skin at least partially covering the chassis assembly, the skin comprising: a first door providing access to the low voltage chassis section and a first end of the upper environmental chassis section; a second door providing access to the high voltage chassis section; a rear panel providing access to the upper environmental chassis section; a top panel covering a top of the upper environmental chassis section; and at least one hinged door providing access to the lower chassis section.

2. The additive manufacturing apparatus according to any preceding clause, wherein at least one of the first door, the second door, and the top panel is perforated to allow ventilation through the skin.

3. The additive manufacturing apparatus according to any preceding clause, wherein the skin further comprises a material supply port through which powder, fluids, and air are received from a material handling system into the additive manufacturing apparatus.

4. The additive manufacturing apparatus according to any preceding clause, wherein the chassis further comprises a pair of machine hoisting beams coupled to the upper environmental chassis section and accessible through the skin.

5. The additive manufacturing apparatus according to any preceding clause, wherein: the lower chassis section comprises a pair of horizontal carriage supports each extending between the first end and the second end of the lower chassis section upon which the build receptacle carriage is disposed; and the build receptacle carriage comprises an adjustment pin that pushes against the lower chassis section to adjust a position of the build receptacle carriage between the first end and the second end of the lower chassis section along the pair of horizontal carriage supports.

6. The additive manufacturing apparatus according to any preceding clause, further comprising a plurality of positioning blocks configured for adjustably coupling a lift system to the build receptacle carriage, and adjusting the coupling of the lift system to the build receptacle carriage moves the lift system within the build receptacle carriage in a direction perpendicular to a longitudinal direction of the lower chassis section extending from the first end to the second end of the lower chassis section.

7. The additive manufacturing apparatus according to any preceding clause, further comprising: a linear motion assembly coupled to the upper environmental chassis section, the linear motion assembly comprising a linear rail defining a working axis for the additive manufacturing apparatus, wherein the rear panel provides access to the linear motion assembly; a recoat head removably coupled to the linear rail through a first linear rail carriage to move a powder material from a powder supply to a build area; a print head removably coupled to the linear rail through a second linear rail carriage to deposit a binder material in the build area; wherein the recoat head and the print head are cantilevered from the linear rail.

8. The additive manufacturing apparatus according to any preceding clause, wherein a length of the rear panel in a direction parallel to the working axis of the additive manufacturing apparatus is greater than a length of the linear motion assembly in the direction parallel to the working axis of the additive manufacturing apparatus.

9. The additive manufacturing apparatus according to any preceding clause, wherein the linear motion assembly comprises at least a pair of gussets accessible through the rear panel for lifting the linear motion assembly.

10. The additive manufacturing apparatus according to any preceding clause, further comprising: a support rail coupled to each of the recoat head and the print head through a corresponding support arm; wherein the support rail extends in a direction parallel to and is spaced apart from the linear motion assembly.

11. The additive manufacturing apparatus according to any preceding clause, wherein the support rail is coupled to a top panel of a process chamber surrounding the linear motion assembly, the recoat head, and the print head.

12. The additive manufacturing apparatus according to any preceding clause, wherein the support rail is coupled to a working surface within the additive manufacturing apparatus.

13. The additive manufacturing apparatus according to any preceding clause, wherein the skin comprises a recess therein for removably mounting a mobile computing device.

14. The additive manufacturing apparatus according to any preceding clause, further comprising: a system panel mounted to the lower chassis section via hinges, the system panel having system components mounted on a first side and a second side of the system panel for the operation of the additive manufacturing apparatus, wherein the system panel is rotatable between a first position in which the system panel is parallel to the at least one hinged door providing access to the lower chassis section such that when the at least one hinged door is closed, the first side of the system panel is positioned between the at least one hinged door and the second side of the system panel, and a second position in which the second side of the system panel is exposed through the skin.

15. The additive manufacturing apparatus according to any preceding clause, wherein the system component mounted on the system panel comprise components of a pneumatic system of the additive manufacturing apparatus.

16. The additive manufacturing apparatus according to any preceding clause, further comprising: a conveyor system extending through the lower chassis section in a direction perpendicular to a length of the lower chassis section extending from the first end to the second end of the lower chassis section; and a tunnel enclosing the conveyor system, the tunnel comprising a lid that opens for access to the conveyor system.

17. A method for servicing the additive manufacturing apparatus of any preceding clause, comprising: opening the first door to access a low voltage electrical cabinet mounted to the low voltage chassis section.

18. A method for servicing the additive manufacturing apparatus of any preceding clause, comprising: opening the second door to access a high voltage electrical cabinet mounted to the high voltage chassis section.

19. A method for servicing the additive manufacturing apparatus of any preceding clause, comprising: opening the at least one hinged door providing access to the lower chassis section to access one or more of a binder tank, a cleaning solution tank, and a system panel.

20. A method for servicing the additive manufacturing apparatus of any preceding clause, comprising: opening one or more of a recoat bay door and a print bay door to access a corresponding recoat bay or print bay positioned between the upper environmental chassis section and the lower chassis section.

21. A method for servicing the additive manufacturing apparatus of any preceding clause, comprising: removing at least one of the rear panel, the top panel, and a front panel of the skin.

22. A method for servicing the additive manufacturing apparatus of any preceding clause, comprising: decoupling the print head and the recoat head from the linear motion assembly; removing the rear panel from the additive manufacturing apparatus to expose the linear motion assembly through the skin; engaging the pair of gussets of the linear motion assembly with a fork lift; and removing the linear motion assembly from the additive manufacturing apparatus.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. An additive manufacturing apparatus comprising:
    a chassis assembly comprising:
        a low voltage chassis section;
        a lower chassis section secured to the low voltage chassis section at a first end of the lower chassis section;
        an upper environmental chassis section secured to and extending over the low voltage chassis section and the lower chassis section;
        a high voltage chassis section secured to the upper environmental chassis section and the lower chassis section at a second end of the lower chassis section; and
        a build receptacle carriage adjustably coupled to the lower chassis section; and a skin at least partially covering the chassis assembly, the skin comprising:
        a first door providing access to the low voltage chassis section and a first end of the upper environmental chassis section;
        a second door providing access to the high voltage chassis section;
        a rear panel providing access to the upper environmental chassis section;

a top panel covering a top of the upper environmental chassis section; and at least one hinged door providing access to the lower chassis section.

2. The additive manufacturing apparatus according to claim 1, wherein at least one of the first door, the second door, and the top panel is perforated to allow ventilation through the skin.

3. The additive manufacturing apparatus according to claim 1, wherein the skin further comprises a material supply port through which powder, fluids, and air are received from a material handling system into the additive manufacturing apparatus.

4. The additive manufacturing apparatus according to claim 1, wherein the chassis further comprises a pair of machine hoisting beams coupled to the upper environmental chassis section and accessible through the skin.

5. The additive manufacturing apparatus according to claim 1, wherein:

the lower chassis section comprises a pair of horizontal carriage supports each extending between the first end and the second end of the lower chassis section upon which the build receptacle carriage is disposed; and the build receptacle carriage comprises an adjustment pin that pushes against the lower chassis section to adjust a position of the build receptacle carriage between the first end and the second end of the lower chassis section along the pair of horizontal carriage supports.

6. The additive manufacturing apparatus according to claim 1, further comprising a plurality of positioning blocks configured for adjustably coupling a lift system to the build receptacle carriage, and adjusting the coupling of the lift system to the build receptacle carriage moves the lift system within the build receptacle carriage in a direction perpendicular to a longitudinal direction of the lower chassis section extending from the first end to the second end of the lower chassis section.

7. The additive manufacturing apparatus according to claim 1, further comprising:

a linear motion assembly coupled to the upper environmental chassis section, the linear motion assembly comprising a linear rail defining a working axis for the additive manufacturing apparatus, wherein the rear panel provides access to the linear motion assembly;

a recoat head removably coupled to the linear rail through a first linear rail carriage to move a powder material from a powder supply to a build area; and a print head removably coupled to the linear rail through a second linear rail carriage to deposit a binder material in the build area, wherein the recoat head and the print head are cantilevered from the linear rail.

8. The additive manufacturing apparatus according to claim 7, further comprising:

a support rail coupled to each of the recoat head and the print head through a corresponding support arm;

wherein the support rail extends in a direction parallel to and is spaced apart from the linear motion assembly.

9. The additive manufacturing apparatus according to claim 8, wherein the support rail is coupled to a front panel of a process chamber surrounding the linear motion assembly, the recoat head, and the print head.

10. The additive manufacturing apparatus according to claim 8, wherein the support rail is coupled to a working surface within the additive manufacturing apparatus.

11. The additive manufacturing apparatus according to claim 1, wherein the skin comprises a recess therein for removably mounting a mobile computing device.

12. The additive manufacturing apparatus according to claim 1, further comprising:

a system panel mounted to the lower chassis section via hinges, the system panel including system components mounted on a first side and a second side of the system panel, wherein the system panel is rotatable between a first position and a second position, the system panel being parallel to the at least one hinged door providing access to the lower chassis section when the system panel is in the first position, the second side of the system panel is exposed through the skin when the system panel is in the second position, wherein the first side of the system panel is positioned between the at least one hinged door and the second side of the system panel when the at least one hinged door is closed.

13. The additive manufacturing apparatus according to claim 12, wherein the system component mounted on the system panel comprise components of a pneumatic system of the additive manufacturing apparatus.

14. The additive manufacturing apparatus according to claim 1, further comprising:

a conveyor system extending through the lower chassis section in a direction perpendicular to a length of the lower chassis section extending from the first end to the second end of the lower chassis section; and a tunnel enclosing the conveyor system, the tunnel comprising a lid that opens for access to the conveyor system.

15. A method for servicing the additive manufacturing, comprising:

a chassis assembly comprising:

a low voltage chassis section;

a lower chassis section secured to the low voltage chassis section at a first end of the lower chassis section;

an upper environmental chassis section secured to and extending over the low voltage chassis section and the lower chassis section;

a high voltage chassis section secured to the upper environmental chassis section and the lower chassis section at a second end of the lower chassis section; and a build receptacle carriage adjustably coupled to the lower chassis section; and a skin at least partially covering the chassis assembly, the skin comprising:

a first door providing access to the low voltage chassis section and a first end of the upper environmental chassis section;

a second door providing access to the high voltage chassis section;

a rear panel providing access to the upper environmental chassis section;

a top panel covering a top of the upper environmental chassis section; and at least one hinged door providing access to the lower chassis section, wherein the method comprises opening the first door to access a low voltage electrical cabinet mounted to the low voltage chassis section.

16. The method of claim 15, further comprising:

opening the second door to access a high voltage electrical cabinet mounted to the high voltage chassis section.

17. The method of claim 15, further comprising:
opening the at least one hinged door providing access to the lower chassis section to access one or more of a binder tank, a cleaning solution tank, and a system panel.

18. The method of claim 15, further comprising:
opening one or more of a recoat bay door and a print bay door to access a corresponding recoat bay or print bay positioned between the upper environmental chassis section and the lower chassis section.

19. The method of claim 15, further comprising:
removing at least one of the rear panel, the top panel, and a front panel of the skin.

20. The method of claim 15, further comprising:
a linear motion assembly coupled to the upper environmental chassis section, the linear motion assembly comprising:
  a linear rail defining a working axis for the additive manufacturing apparatus; and
  at least a pair of gussets accessible through the rear panel for lifting the linear motion assembly, wherein the rear panel provides access to the linear motion assembly;
  a recoat head removably coupled to the linear rail through a first linear rail carriage to move a powder material from a powder supply to a build area; and
  a print head removably coupled to the linear rail through a second linear rail carriage to deposit a binder material in the build area,
wherein the recoat head and the print head are cantilevered from the linear rail,
wherein the method further comprises:
  decoupling the print head and the recoat head from the linear motion assembly;
  removing the rear panel from the additive manufacturing apparatus to expose the linear motion assembly through the skin;
  engaging the pair of gussets of the linear motion assembly with a fork lift; and
  removing the linear motion assembly from the additive manufacturing apparatus.

\* \* \* \* \*